United States Patent
Chopra et al.

(10) Patent No.: US 11,373,258 B2
(45) Date of Patent: Jun. 28, 2022

(54) FINANCIAL INSTITUTION MORTGAGE PORTFOLIO ASSET INVENTORY AUCTION SYSTEMS AND METHODS

(71) Applicant: MASTERCARD INTERNATIONAL INCORPORATED, Purchase, NY (US)

(72) Inventors: Gautam Chopra, Delhi (IN); Sibasis Mohanty, Haryana (IN); Ashish Mathew, New Delhi (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 44 days.

(21) Appl. No.: 16/057,658

(22) Filed: Aug. 7, 2018

(65) Prior Publication Data

US 2020/0051188 A1 Feb. 13, 2020

(51) Int. Cl.
  *G06Q 40/04* (2012.01)
  *G06Q 50/16* (2012.01)
(52) U.S. Cl.
  CPC .......... *G06Q 50/167* (2013.01); *G06Q 40/04* (2013.01)
(58) Field of Classification Search
  CPC ......... G06Q 40/00; G06Q 20/00; G06Q 40/08
  See application file for complete search history.

(56) References Cited

U.S. PATENT DOCUMENTS

| | | | |
|---|---|---|---|
| 6,829,590 B1* | 12/2004 | Greener | G06Q 40/04 705/31 |
| 8,380,589 B2 | 2/2013 | Deane et al. | |
| 8,577,793 B1 | 11/2013 | Hecht et al. | |
| 9,805,414 B2 | 10/2017 | Jones | |
| 2001/0037284 A1* | 11/2001 | Finkelstein | G06Q 40/04 705/37 |
| 2003/0004867 A1* | 1/2003 | Kight | G06Q 20/02 705/39 |
| 2003/0126075 A1* | 7/2003 | Mascavage, III | G06Q 20/02 705/39 |
| 2003/0140004 A1* | 7/2003 | O'Leary | G06Q 20/04 705/39 |
| 2007/0050285 A1* | 3/2007 | Freeman | G06Q 40/025 705/38 |
| 2010/0131426 A1* | 5/2010 | Kroutik | G06Q 30/00 705/36 R |
| 2011/0238566 A1* | 9/2011 | Santos | G06Q 40/025 705/38 |
| 2013/0085937 A1* | 4/2013 | Wesson | G06Q 40/02 705/40 |

(Continued)

*Primary Examiner* — Scott C Anderson
*Assistant Examiner* — Xavier M. Bennett
(74) *Attorney, Agent, or Firm* — Armstrong Teasdale LLP

(57) ABSTRACT

An electronic mortgage portfolio asset auction system includes at least one host computing device that assembles a mortgage asset inventory from received mortgage asset data of a plurality of financial institutions for bidding. The host computing device filters the mortgage asset inventory in view of a bidder's mortgage asset purchase criteria to identify mortgage assets corresponding to the bid order, generates at least one ranked list of the identified mortgage assets by applying financial institution preference criteria, and presents the at least one ranked list to the first one of the plurality of financial institutions.

25 Claims, 7 Drawing Sheets

(56) References Cited

U.S. PATENT DOCUMENTS

| | | | | |
|---|---|---|---|---|
| 2013/0218664 A1* | 8/2013 | Carlson | .............. | G06Q 30/0244 705/14.43 |
| 2014/0201001 A1* | 7/2014 | Rellas | ................ | G06Q 30/0261 705/26.25 |
| 2014/0279638 A1* | 9/2014 | Raymond | .......... | G06Q 10/1057 705/322 |
| 2015/0052053 A1* | 2/2015 | Howe | .................. | G06Q 20/409 705/44 |
| 2015/0066740 A1* | 3/2015 | DiCarlo | ................ | G06Q 40/04 705/38 |
| 2015/0178870 A1* | 6/2015 | VonBergen | .......... | G06Q 50/188 705/80 |
| 2016/0203467 A1* | 7/2016 | Khan | ................ | G06Q 20/382 705/39 |
| 2017/0011369 A1* | 1/2017 | Wesson | .................. | G06Q 40/02 |
| 2017/0132679 A1* | 5/2017 | Lind | .................. | G06Q 30/0609 |
| 2017/0243285 A1* | 8/2017 | Friedman | ............... | G06Q 30/08 |
| 2018/0078843 A1* | 3/2018 | Tran | ..................... | A61B 5/0024 |
| 2018/0293581 A1* | 10/2018 | Bansal | ............... | G06Q 20/4016 |
| 2019/0280855 A1* | 9/2019 | Tong | ..................... | G06F 16/245 |
| 2019/0363889 A1* | 11/2019 | Wang | ................... | H04L 9/3236 |

\* cited by examiner

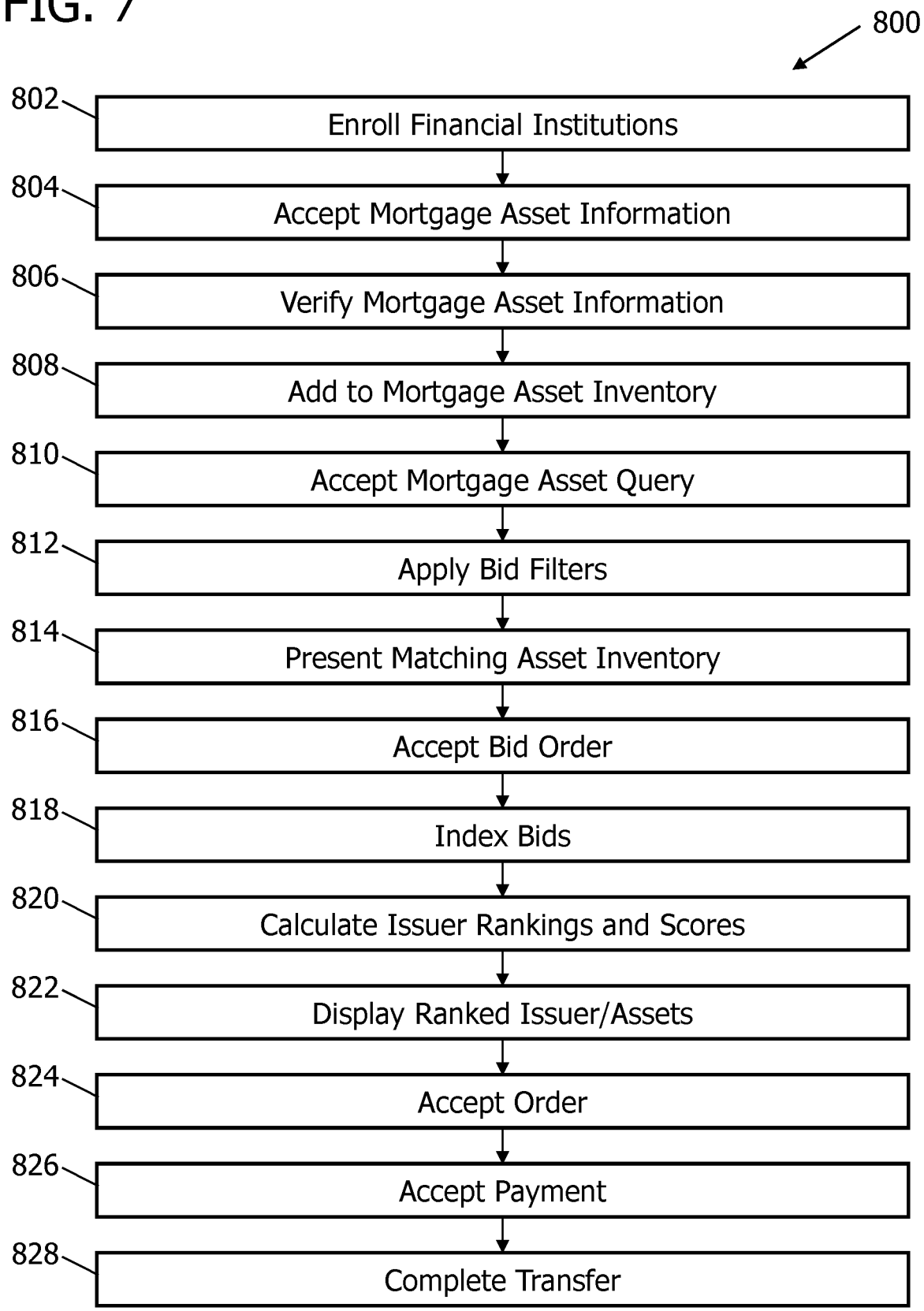

FINANCIAL INSTITUTION MORTGAGE PORTFOLIO ASSET INVENTORY AUCTION SYSTEMS AND METHODS

BACKGROUND

This disclosure relates generally to electronic systems facilitating digital information and exchange of mortgage portfolio asset information by financial institutions to cooperatively manage mortgage portfolio risks, and more specifically to electronic systems facilitating mortgage asset transactions between mortgage issuers or mortgage holders and other financial institutions to mitigate economic risks associated with mortgage assets to community, regional, national and international economies.

Mortgage issuers such as banks, savings and loans, or other financial institutions play an important role in establishing, maintaining and growing an economy in a given community by financing desirable residential or commercial real estate transactions. For any given community, the number of available mortgage issuers, the balance sheets of the available mortgage issuers, and overall health of the available mortgage issuers in the community are driving factors for the economic health of the community. An inadequate number of mortgage issuers, or distressed mortgage issuers in the given community, can have an outsize influence on the economy of the community as a whole.

Mortgage issuers large and small face practical difficulties in managing risks posed by mortgage asset portfolios, and in some cases lack practical tools to mitigate mortgage asset portfolio risk that may be presented well after the mortgage assets were initially originated or were otherwise acquired. In today's interconnected world including large, regional, national and even international financial institutions firms issuing mortgage loans, economic effects stemming from mortgage asset risks may extend well beyond local communities, and in some cases may undesirably affect much larger regions (e.g., entire states and groups of states) an entire country, or groups of countries.

Online systems providing inter-mortgage issuer information exchange and mortgage asset transaction capability to more effectively manage mortgage asset portfolio risks while also mitigating risks to larger economies are desired.

BRIEF DESCRIPTION

In one aspect, the disclosure provides a mortgage portfolio asset auction system including at least one host computing device having at least one processor in communication with a memory device. The at least one host computing device is configured to receive mortgage asset data from each of a plurality of financial institutions, the mortgage asset data including an asking price for at least one mortgage asset that is being offered for sale. The at least one host computing device is also configured to assemble a mortgage asset inventory from the received mortgage asset data including the mortgage asset data of all of the plurality of financial institutions, receive a bid order from a first one of the plurality of financial institutions including mortgage asset purchase criteria, filter the mortgage asset inventory in view of the mortgage asset purchase criteria to identify mortgage assets corresponding to the bid order, generate at least one ranked list of the identified mortgage assets by applying at least one predetermined preference criteria, and present the at least one ranked list to the first one of the plurality of financial institutions.

In another aspect, the disclosure provides a method for electronically auctioning mortgage portfolio assets by participating financial institutions. The method is implemented with at least one host computing device having at least one processor in communication with a memory device, and the method includes receiving, by the at least one host computing device, mortgage asset data from each of a plurality of financial institutions, the mortgage asset data including an asking price for at least one mortgage asset that is being offered for sale. The method also includes assembling, by the at least one host computing device, a mortgage asset inventory from the received mortgage asset data including the mortgage asset data of all of the plurality of financial institutions, and receiving, by the at least one host computing device, a bid order from a first one of the plurality of financial institutions including mortgage asset purchase criteria. The method further includes filtering the mortgage asset inventory in view of the mortgage asset purchase criteria to identify mortgage assets corresponding to the bid order, generating at least one ranked list of the identified mortgage assets by applying at least one predetermined preference criteria, and presenting the at least one ranked list to the first one of the plurality of financial institutions.

In another aspect, the disclosure provides an electronic mortgage portfolio foreclosed property asset auction system including at least one host computing device comprising at least one processor in communication with a memory device and a payment processor. The at least one host computing device is configured to receive foreclosed property asset data from each of a plurality of financial institutions, the foreclosed property asset data including an asking price for at least one foreclosed property that is being offered for sale. The at least one host computing device is also configured to: assemble a foreclosed property asset inventory from the received foreclosed property asset data of all of the plurality of financial institutions; receive a bid order from a first one of the plurality of financial institutions including property asset purchase criteria; filter the foreclosed property asset inventory in view of the property asset purchase criteria to identify foreclosed properties foreclosed properties corresponding to the bid order; generate a ranked list of the identified foreclosed properties according to financial institution preference criteria for the respective identified foreclosed properties, and provide the ranked list of the identified foreclosed properties to the first one of the plurality of financial institutions.

BRIEF DESCRIPTION OF THE DRAWINGS

FIG. 7 shows an exemplary process of the mortgage portfolio asset auction system shown in FIGS. 2 and 3.

DETAILED DESCRIPTION OF THE DISCLOSURE

Figure 1:
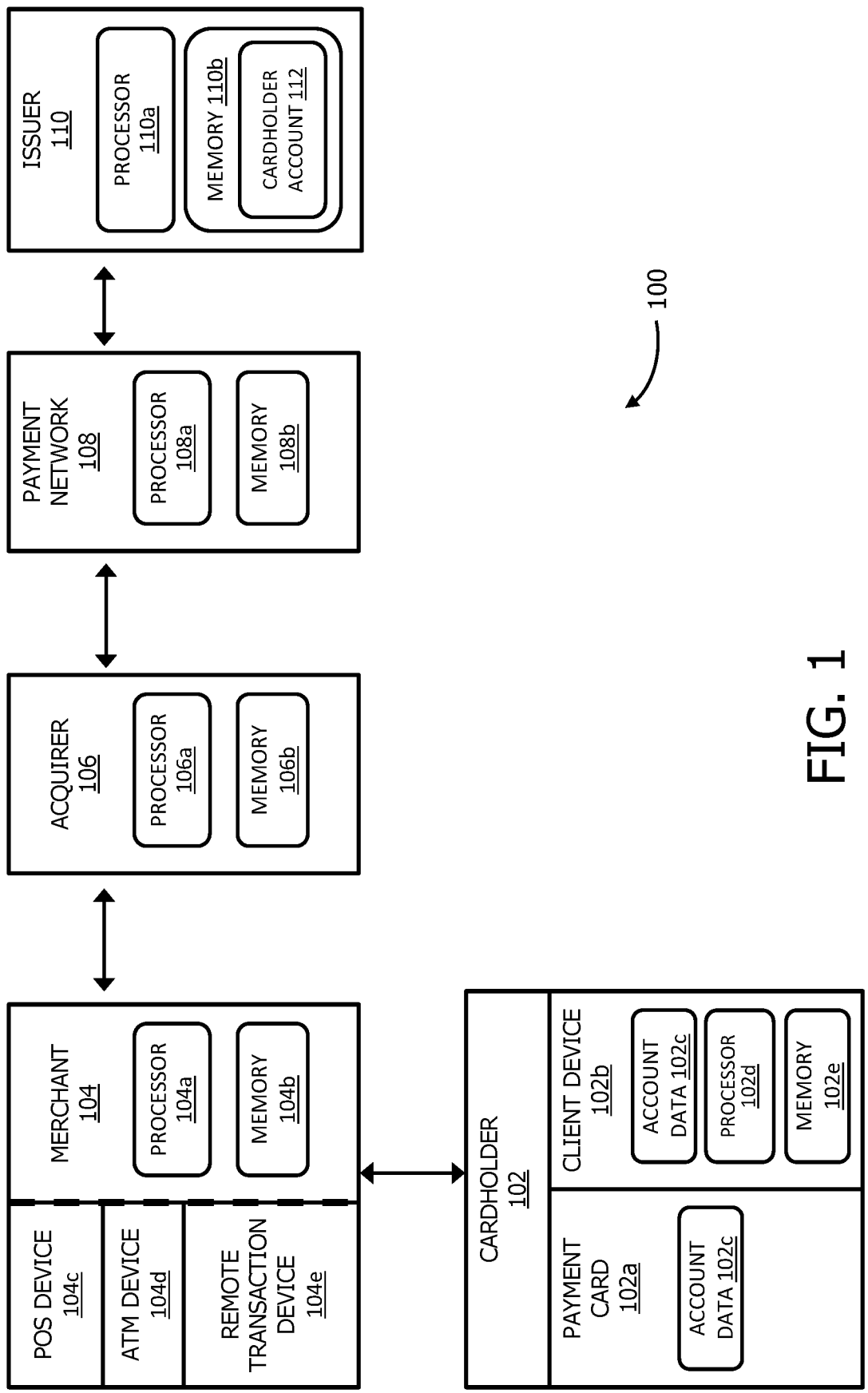
FIG. 1 is a schematic diagram illustrating an exemplary multi-party payment processing network system for processing payment card transaction and/or processing account to account payment transactions.

The following detailed description illustrates embodiments of the disclosure by way of example and not by way of limitation. The description enables one skilled in the art to make and use the disclosure, describes several embodiments, adaptations, variations, alternatives, and uses of the disclosure, including what is presently believed to be the best mode of carrying out the disclosure.

For the purposes of the following description, a mortgage loan (sometimes referred to simply as "a mortgage") is a promissory note and a security interest in real estate. A borrower agrees to pay the mortgage loan subject to the lender having the right to exercise the security interest and obtain possession of the real estate property via a process known as foreclosure if the borrower defaults according to the terms of the mortgage loan. The underlying real estate may be residential or commercial, with the mortgage typically being obtained to finance the purchase of the real estate, finance improvements to the real estate, or to provide access to equity in the property. Mortgages may be refinanced via another mortgage loan that replaces the existing mortgage.

A mortgage issuer shall refer to a financial institution that originates a mortgage loan, including acceptance of a mortgage application including applicant information and real estate information for a proposed property purchase/acquisition, improvement to the property, or refinance of an existing mortgage loan. The mortgage issuer typically performs mortgage underwriting to determine if the risk of offering a mortgage loan to a particular borrower under certain parameters is acceptable. If the mortgage loan meets underwriting requirements for approval, the mortgage issuer generates or provides the mortgage loan documents for execution by the appropriate parties to the transaction, and completes the transfer of settlement funds to one or more of the parties upon closing. Various different types of financial institutions issue mortgages, including but not necessarily limited to banks, savings and loans, and credit unions.

A mortgage holder is a person or company that has a right to enforce a mortgage loan agreement. A mortgage issuer is the initial mortgage holder and may remain the mortgage holder, or may transfer the mortgage rights to another mortgage holder, typically another financial institution. The transfer of a mortgage by a mortgage holder to another institution is one way for a financial institution to derive revenue or divest of obligations to service the mortgage.

A mortgage-backed security is a type of asset-backed security that is secured by a mortgage or collection of mortgages. The mortgages are sold to an entity such as an investment bank or group that securitizes, or packages, the mortgage loans together into a security that investors can buy. Investors of mortgage-backed securities may include financial institutions in the mortgage industry.

With respect to any mortgage, the term "mortgage asset" shall include the mortgage loan and its actual income and value to the mortgage holder, or alternatively the mortgaged property after the holder has assumed possession and ownership pursuant to a foreclosure proceeding. Financial institutions in the mortgage industry typically hold a portfolio of mortgage assets including loan assets and property assets in the form of properties owned and obtained via foreclosure proceedings. The disclosure below includes exemplary systems and methods facilitating risk management of the property assets in a mortgage portfolio, although similar risk management of the loan assets may likewise be facilitated as well.

To understand the potential economic impact of mortgage assets held in portfolios by financial institutions look no further than what is now commonly referred to as the subprime mortgage crisis that occurred in the 2007 to 2010 timeframe. The subprime mortgage crisis stemmed from certain mortgage lending practices in the mortgage industry that expanded credit to mortgage borrowers and stimulated the housing market, but proved to be unsustainable when high numbers of delinquent mortgages and mortgage defaults eventually resulted. As mortgage delinquencies and defaults increased, mortgage income from mortgage asset portfolios held by some financial institutions dropped precipitously, even to the point of raising financial solvency questions for financial institutions large and small having disproportionate exposure to subprime mortgages in their mortgage portfolios, prompting a nationwide banking emergency beginning in about 2007 and contributing to a national economic recession in the same timeframe.

As the subprime mortgage crisis unfolded, mortgage issuers across the country became much more restrictive in mortgage underwriting and approval of new mortgage loan applications. Many mortgaged properties were foreclosed upon, but difficult market conditions prevented mortgage holders from selling them. Accumulation of foreclosed properties without being able to sell them imposed additional stress on mortgage holders, causing further tightening in mortgage lending. Many mortgages issuers and/or mortgage holders found themselves with out-of-balance mortgage asset portfolios including undesirably high numbers of delinquencies and defaults representing a growing proportion of total mortgage assets failing to produce income, growing numbers of foreclosed properties now owned by the mortgage issuer at some cost, and an undesirably small number of mortgage loans in good standing to produce income. Consequently, substantial questions were raised regarding the solvency of certain mortgage issuers and mortgage holders both large and small in the industry.

As the concerns of the fallout from the subprime mortgage crisis to the mortgage issuer industry became more widespread, the property market in the United States fell dramatically. Property values plummeted nearly 20% on average from the peak in 2006 before the subprime mortgage crisis took effect, and home equity fell trillions of dollars from about 13 trillion dollars to about 8.8 trillion dollars in about two years. This caused further stress in the housing market as increasing numbers of borrowers found themselves obligated to "underwater" mortgages (e.g., mortgage loans exceeding the market value of the mortgaged property), which further contributed to mortgage delinquency and default. The effects soon spilled over to the larger economy as borrowers found themselves in more difficult financial situations overall and consumer spending fell accordingly. The commercial property market was not immune from similar dynamics, and the problems only seemed to get worse. Refinancing for either residential or commercial property was very difficult to accomplish, and credit issues for distressed borrowers began to multiply.

A proliferation of mortgage-backed securities prior to the subprime mortgage crisis taking hold presented another dimension to an already difficult problem. Investors holding mortgage backed securities now faced much uncertainty in the value and viability of such investments, leading to stock market corrections and further negativity on the economic front, presenting yet another drag on the national economy. But these effects were not limited to the United States. Global distribution of mortgage backed securities to financial firms around the world quickly began to affect economies overseas.

In view of rapidly deteriorating confidence in mortgage-backed securities, global investors drastically reduced purchases of mortgage-backed securities, imposing further constraints on a capacity and willingness of mortgage issuers to accept new loans. Questions regarding the soundness of U.S. credit and financial markets led to tightening credit and slowing economic growth in the U.S. and Europe. Lehman Brothers Holdings Inc., a global financial services firm and the fourth largest investment bank in the United States at the time, filed for bankruptcy in 2008 largely because of its exposure to mortgage-backed securities including subprime mortgages and the illiquidity of assets caused by the subprime mortgage crisis, causing an equity market collapse in the United States and in other equity markets across the globe.

Severe economic consequences for the U.S. and European economies followed for some time, with effects that arguably linger still to this day. While conditions have improved and lending practices have been reformed in response to the subprime mortgage crisis and government intervention, mortgage issuers and mortgage holders still lack practical tools to help them mitigate risks in some aspects with respect to their mortgage portfolios. For example, obtaining ownership of mortgaged properties by financial institutions via foreclosure proceedings still results in income reduction from the mortgages defaulted upon that no longer produce revenue, while imposing costs (property taxes, insurance, etc.) until the foreclosed properties can be resold.

The sale of a foreclosed property, however, tends to be somewhat opaque in certain aspects. For example, prospective purchasers may lack awareness that certain properties are the subject of foreclosure, which financial institution has assumed ownership of the property, and/or if the property is actually available for sale. If offered for sale, limited information is typically made available to purchasers. Real estate agents exist that specialize in foreclosure sales, but most agents do not. For most persons, dealing directly with financial institutions on mostly non-negotiable "as is" sales of foreclosed property with limited property inspection opportunity, coupled with the perception that some financial institutions are generally uncooperative to timely complete a sale, means that foreclosed properties appeal only to a small, niche market of sophisticated buyers in certain areas. Mortgage holders are therefore sometimes challenged to sell foreclosed properties even at nominal prices.

Public auctions are sometimes the best vehicle for a financial institution to unload a foreclosed property. Often, public auctions lack competition, however, to increase the bid price close to market value of the property. In public auctions, financial institutions also generally lack any influence regarding who becomes the most likely purchaser. Public auctions likewise tend to suffer from a lack of information about the foreclosed property to attract more bidders, and typically are not widely advertised or known to the public at large or to other financial institutions. Potential purchasers generally must be present at the time and place of the auction to acquire an auctioned property. Usually, auctioned properties are sold one at a time, making them impractical for certain types of institution investors that may otherwise be interested.

In view of the above discussion, foreclosed property assets in a mortgage asset portfolio continue to present practical problems for certain financial institutions that lack more effective and more efficient tools to practically dispose of them. If certain lenders become laden with disproportionate amounts of foreclosed property assets, a vulnerability to economic impacts locally, regionally, and even internationally still exists.

Online systems and methods of the present disclosure provide a convenient interlinkage between mortgage issuers or mortgage holders and other financial institutions having the resources and expertise to purchase mortgage assets such as foreclosed properties from one another. Recognizing that many financial institutions in the mortgage industry are quite sophisticated with respect to mortgages, foreclosures, real estate transfers and real estate investments, opportunities between financial institutions to privately buy mortgage assets from one another on mutually agreeable terms in a highly efficient manner is beneficial to all. By virtue of the systems and methods of the disclosure, mortgage issuers or mortgage holders may dispose of mortgage portfolio assets more quickly and on more favorable terms, while other financial institutions may discover and acquire desirable properties that, outside of the systems and methods of the disclosure, may not have been easily discoverable or timely acquired in a conventional manner or via conventional automated auction systems. Unlike conventional systems, a direct, bulk transfer of property assets is possible between financial institutions having sizable mortgage asset portfolios.

Based on mortgage asset information accepted or collected by the system, mortgage assets may be made available (i.e., offered for sale) to all of the plurality of participating financial institutions. Bids for mortgage assets being offered for sale by each participating financial institution may likewise be received from other ones of the plurality of participating financial institutions. The bids may be indexed and matched against available properties offered for sale to find the most optimal property assets for a bid order. Unlike conventional systems, participating financial institutions may therefore place bid orders without specific awareness of any mortgage assets that meet the desired criteria, or perhaps without awareness of financial institutions holding those mortgage assets, and in response the systems and methods retrieve and analyze the mortgage assets from the database for presentation to each bidder.

More specifically, at least one ranked list of available property assets is presented in the systems and methods of the disclosure in response to bids submitted by participating financial institutions. The ranked list of available property assets is generated according to bidder profiles and preferences of each respective participating bidder for review and acceptance in a highly transparent manner. Accepted bids may be processed in the system and method of the disclosure, including payment processing and handling of settlement funds for transactions completed and ownership transfer documentation in a highly efficient and transparent manner to the financial institutions involved, avoiding the constraints and delays of conventional auction processes. The system and method of the disclosure may operate continuously to provide an ongoing, real time live auction of mortgage assets on a portfolio level, as opposed to individual properties in conventional auctions, in a generally competitive, yet largely automated manner with limited input required by bidding financial institutions once the default rules and preferences are established to enable the most desirable property assets to be quickly identified for any bid. With a number of financial institutions participating around the globe in a vastly improved auction system, vastly improved opportunities to quickly sell foreclosed properties of one financial institution to another that seeks to profit from the acquisition is beneficial to each, as well as fosters and promotes local economies and insulates mortgage issuers and mortgage holders from effects of unbalanced portfolios that can affect economies large and small.

The systems and methods of the disclosure operate according to rules and algorithms applying preference criteria and weighting factors allowing each of the bidding financial institutions to quickly obtain the most desirable mortgage assets for possible acquisition. The preference criteria and weighting factors may be unique to each participating bidder, and may flexibly be selected and adjusted allowing bidder institutions to understand the impact of the preference criteria and weighting factors on system operation. Preferred institution criteria and weights may be applied, scores may be generated for specific mortgage assets meeting the criteria, and comparisons of different ranking criteria may be automatically undertaken by the system and method of the disclosure to foster relationships with certain ones of the financial institutions while still obtaining mortgage assets at favorable prices competitive with other participating financial institutions. Incentives may also be implemented in an automated manner to more quickly obtain bid orders or acceptance on a financial institution basis or a mortgage asset basis. Improved capabilities to meet the needs of financial institutions, as opposed to individual property owners or mortgage holders of property assets being offered one at a time, are provided in the systems and methods of the disclosure. Fully automated or mostly automated property transfers are possible between financial institutions with no or very limited human interaction (e.g., a single click to accept a bid), streamlining the property asset transfer options considerably in a vastly reduced window of time needed to complete a transaction.

In one embodiment, the disclosure provides a mortgage portfolio asset auction system including at least one host computing device having at least one processor in communication with a memory device. The at least one host computing device is configured to receive mortgage asset data from each of a plurality of financial institutions, the mortgage asset data including an asking price for at least one mortgage asset that is being offered for sale. The at least one host computing device is also configured to assemble a mortgage asset inventory from the received mortgage asset data including the mortgage asset data of all of the plurality of financial institutions, receive a bid order from a first one of the plurality of financial institutions including mortgage asset purchase criteria, filter the mortgage asset inventory in view of the mortgage asset purchase criteria to identify mortgage assets corresponding to the bid order, generate at least one ranked list of the identified mortgage assets by applying at least one predetermined preference criteria, and present the at least one ranked list to the first one of the plurality of financial institutions.

Optionally, the at least one host computing device is also configured to score the identified mortgage assets according to at least one combination of a weighting factor and a financial institution preference parameter. The at least one host computing device may be configured to apply a financial institution preference parameter that: defines a percentage of identified mortgage assets offered by at least one of the plurality of financial institutions, is input by the first one of the plurality of financial institutions, corresponds to a prior purchase history between the first one of the plurality of financial institutions and a financial institution offering one of the identified mortgage assets in view of at least one of a frequency and recency of transactions in the prior purchase history, or that is based upon an affinity of the first one of the plurality of financial institutions for another selected one of the plurality of financial institutions.

The at least one host computing device may likewise be configured to generate a first ranked list of the identified mortgage assets and a second ranked list of the identified mortgage assets, each of the first and second ranked lists being ranked according to different criteria, and compare a portion of the first ranked list to a portion of the second ranked list to identify matching entries on the first portion and the second portion. The at least one host computing device is configured to generate the first ranked list according to financial institution preference criteria and generate the second ranked list according to pricing criteria for the identified assets.

The at least one host computing device may also be configured to recommend a mortgage asset from the at least one ranked list for the first one of the plurality of financial institutions to purchase. The at least one host computing device may be configured to verify at least a portion of the received mortgage asset data. A payment processor may be in communication with the at least one host computing device, wherein the at least one host computing device is configured to submit an accepted order for at least one of the identified mortgage assets to the payment processor.

The at least one host computing device may be configured to apply a preferred issuer tolerance band to the asking price to mortgage assets offered by identified ones of the plurality of financial institutions when filtering the mortgage asset inventory. The at least one host computing device may be configured to accept an incentive that may be redeemed by the first one of the plurality of the financial institutions in purchasing a mortgage asset. The at least one host computing device may be configured to perform an ownership transfer task for an accepted bid order. The at least one host computing device may be configured to receive foreclosed property asset data from each of the plurality of financial institutions.

In another embodiment, the disclosure provides a method for electronically auctioning mortgage portfolio assets by participating financial institutions. The method is implemented with at least one host computing device having at least one processor in communication with a memory device, and the method includes receiving, by the at least one host computing device, mortgage asset data from each of a plurality of financial institutions, the mortgage asset data including an asking price for at least one mortgage asset that is being offered for sale. The method also includes assembling, by the at least one host computing device, a mortgage asset inventory from the received mortgage asset data including the mortgage asset data of all of the plurality of financial institutions, and receiving, by the at least one host computing device, a bid order from a first one of the plurality of financial institutions including mortgage asset purchase criteria. The method further includes filtering the mortgage asset inventory in view of the mortgage asset purchase criteria to identify mortgage assets corresponding to the bid order, generating at least one ranked list of the identified mortgage assets by applying at least one predetermined preference criteria, and presenting the at least one ranked list to the first one of the plurality of financial institutions.

Optionally, the method further includes scoring the identified mortgage assets according to at least one combination of a weighting factor and a financial institution preference parameter. The method may include applying one or more of a financial institution preference parameter selected from the group of: a financial information parameter that defines a percentage of identified mortgage assets offered by at least one of the plurality of financial institutions; a financial institution preference parameter that is input by the first one of the plurality of financial institutions; a financial institution preference parameter corresponding to a prior purchase history between the first one of the plurality of financial institutions and a financial institution offering one of the identified mortgage assets, wherein the financial institution preference parameter is based upon at least one of a frequency and recency of transactions in the prior purchase history; and a financial institution preference parameter that is based upon an affinity of the first one of the plurality of financial institutions for another selected one of the plurality of financial institutions.

The method may likewise include generating a first ranked list of the identified mortgage assets and a second ranked list of the identified mortgage assets, each of the first and second ranked lists being ranked according to different criteria, and comparing a portion of the first ranked list to a portion of the second ranked list to identify matching entries on the first portion and the second portion. The method may further include generating the first ranked list according to financial institution preference criteria and generate the second ranked list according to pricing criteria for the identified assets.

The method may also include recommending a mortgage asset from the at least one ranked list for the first one of the plurality of financial institutions to purchase. The method may include verifying at least a portion of the received mortgage asset data. The method may further be implemented with a payment processing device in communication with the at least one host computing device, and the method may include submitting an accepted order for at least one of the identified mortgage assets to the payment processor.

The method may include applying a preferred issuer tolerance band to the asking price to mortgage assets offered by identified ones of the plurality of financial institutions when filtering the mortgage asset inventory, accepting an incentive that may be redeemed by the first one of the plurality of the financial institutions in purchasing a mortgage asset, and performing an ownership transfer task for an accepted bid order. Receiving mortgage asset data from each of the plurality of financial institutions may include receiving foreclosed property asset data from each of the plurality of financial institutions.

In another embodiment, the disclosure provides an electronic mortgage portfolio foreclosed property asset auction system including at least one host computing device comprising at least one processor in communication with a memory device and a payment processor. The at least one host computing device is configured to receive foreclosed property asset data from each of a plurality of financial institutions, the foreclosed property asset data including an asking price for at least one foreclosed property that is being offered for sale. The at least one host computing device is also configured to: assemble a foreclosed property asset inventory from the received foreclosed property asset data of all of the plurality of financial institutions; receive a bid order from a first one of the plurality of financial institutions including property asset purchase criteria; filter the foreclosed property asset inventory in view of the property asset purchase criteria to identify foreclosed properties foreclosed properties corresponding to the bid order; generate a ranked list of the identified foreclosed properties according to financial institution preference criteria for the respective identified foreclosed properties, and provide the ranked list of the identified foreclosed properties to the first one of the plurality of financial institutions.

The technical problems addressed by the online mortgage portfolio asset auction systems and methods of the disclosure include at least one of: (i) a lack of discoverable digital mortgage portfolio asset information across a number different financial institutions, (ii) inability to digitally assess and cooperatively manage risks of mortgage asset portfolios across a number of financial institutions, (iii) inability to competitively price mortgage assets in a competitive system, (iv) inability to automate mortgage asset transfers between different financial institutions, (v) inability to efficiently market foreclosed properties to other financial institutions in an online manner, (vi) inability to discover information regarding foreclosed properties from online sources, (vii) inability to efficiently filter mortgage asset data to find the most favorable mortgage assets for the particular needs and desires of a particular financial institution, and (viii) inability to apply incentives and buyer preferences to real estate auctions on an institutional basis.

The online mortgage portfolio asset auction systems and methods of the disclosure may be implemented using computer programming or engineering techniques including computer software, firmware, hardware, or any combination or subset thereof, wherein the technical effects may be achieved by (i) assembling an inventory of digital mortgage portfolio asset information across a number different financial institutions, (ii) facilitating a digital risk assessment and cooperative management of risks of mortgage asset portfolios across a number of financial institutions, (iii) enabling competitive price transparency for mortgage assets in an auction system, (iv) automating of mortgage asset transfers between different financial institutions, (v) efficiently marketing foreclosed properties to other financial institutions in an online manner, (vi) providing discoverable and comprehensive information regarding foreclosed properties via a single online system, (vii) filtering of mortgage asset data in a highly efficient manner to identify the most favorable mortgage assets for the particular needs and desires of a particular financial institution, and (viii) providing a flexible application of incentives and buyer preferences to real estate auctions on an institutional basis.

The resulting technical benefits achieved by the online mortgage portfolio asset auction systems and methods of the disclosure include at least one of: (i) providing access to an inventory of digital mortgage portfolio asset information across a number different financial institutions that is otherwise not easily discovered, (ii) enabling a digital risk assessment and cooperative management of risks of mortgage asset portfolios across a number of financial institutions, (iii) promoting competitive price transparency for mortgage assets in an auction system, (iv) automating and simplifying otherwise time and labor intensive mortgage asset transfers, (v) achieving widespread information exchange regarding foreclosed properties to other financial institutions in an online manner, (vi) providing a single online system to discover bid on foreclosed properties held by other participating institutions, (vii) applying customized filtering of mortgage asset data in a highly efficient manner to identify the most favorable mortgage assets for the particular needs and desires of a particular financial institution, and (viii) accommodating a flexible application of incentives and buyer preferences to drive business relationships with other financial institutions.

In one embodiment, a computer program is provided, and the program is embodied on a computer-readable medium. In an example embodiment, the system may be executed on a single computer system, without requiring a connection to a server computer. In a further example embodiment, the system may be run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Apple Inc. located in Cupertino, Calif.). In yet a further embodiment, the system is run on a Mac OS® environment (Mac OS is a registered trademark of Apple Inc. located in Cupertino, Calif.). The application is flexible and designed to run in various different environments without compromising any major functionality. In some embodiments, the system includes multiple components distributed among a plurality of computing devices. One or more components are in the form of computer-executable instructions embodied in a computer-readable medium. The systems and processes are not limited to the specific embodiments described herein. In addition, components of each system and each process can be practiced independently and separately from other components and processes described herein. Each component and process can also be used in combination with other assembly packages and processes.

In one embodiment, a computer program is provided, and the program is embodied on a computer-readable medium and utilizes a Structured Query Language (SQL) with a client user interface front-end for administration and a web interface for standard user input and reports. In another embodiment, the system is web enabled and is run on a business entity intranet. In yet another embodiment, the system is fully accessed by individuals having an authorized access outside the firewall of the business-entity through the Internet. In a further embodiment, the system is being run in a Windows® environment (Windows is a registered trademark of Microsoft Corporation, Redmond, Wash.). The application is flexible and designed to run in various different environments without compromising any major functionality.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the term "database" may refer to either a body of data, a relational database management system (RDBMS), or to both. A database may include any collection of data including hierarchical databases, relational databases, flat file databases, object-relational databases, object oriented databases, and any other structured collection of records or data that is stored in a computer system. The above examples are for example only, and thus, are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the system and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

The term processor, as used herein, may refer to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are for example only, and are thus not limiting as to the types of memory usable for storage of a computer program.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, any type of virtual card (e.g. virtual cards generated by issuers and/or third party processors via mobile bank or desktop apps) and/or any other device that may hold payment account information, such as mobile phones, Smartphones, personal digital assistants (PDAs), key fobs, digital wallets, smart devices (i.e., smart TV) and/or computers. Each type of transactions card can be used as a method of payment for performing a transaction. As used herein, the term "payment account" is used generally to refer to the underlying account with the transaction card. In addition, cardholder card account behavior can include but is not limited to purchases, fund transfer, personal payment, management activities (e.g., balance checking), bill payments, achievement of targets (meeting account balance goals, paying bills on time), and/or product registrations (e.g., mobile application downloads).

As used herein, the term "transaction data" refers to data that includes at least a portion of a cardholder's account information (e.g., cardholder name, account identifier, credit line, security code, and/or expiration data) and at least a portion of purchase information (e.g., price, a type of item and/or service, SKU number, item/service description, purchase date, and/or confirmation number) supplied by a merchant from which the cardholder is making a purchase.

The methods and systems described below enable online mortgage risk mitigation strategies via an online system and method including mortgage asset information collection, asset information exchange and retrieval across a number of different participating mortgage issuers, and also a mortgage transaction platform allowing mortgage issuers to more effectively balance respective mortgage asset portfolios by acquiring or divesting mortgage assets form other mortgage issuers, mortgage holders or other financial institutions.

FIG. 1 is a schematic diagram illustrating an example multi-party payment card system. The present disclosure relates to payment card system 100, such as a credit card payment system using the MASTERCARD payment card system payment network 108 (also referred to as an "interchange" or "interchange network"). Mastercard payment card system payment network 108 (including processor 108a and memory 108b) is a proprietary communications standard promulgated by Mastercard International Incorporated for the exchange of financial transaction data between financial institutions that are members of Mastercard International Incorporated. (MASTERCARD is a registered trademark of Mastercard International Incorporated located in Purchase, N.Y.).

In payment card system 100, a financial institution such as an issuer 110 (including processor 110a and memory 110b) issues a payment card (such as payment card 102a, described below) for an account, such as a credit card account or a debit card account, to a cardholder 102, who uses the payment card to tender payment for a purchase from a merchant 104 (including processor 104a and memory 104b). Cardholder 102 is representative of payment card 102a, such as a physical payment card storing account data 102c for example on a magnetic stripe and/or chip. Cardholder 102 is also representative of client device 102b. Cardholder client device 102b (including processor 102d and memory 102e) stores cardholder 102 account data 102c, e.g., within a digital wallet.

To accept payment with the payment card, merchant 104 must normally establish an account with a financial institution that is part of the financial payment system. This financial institution is usually called the "merchant bank" or the "acquiring bank" or "acquirer bank" or simply "acquirer". When a cardholder 102 tenders payment for a purchase with a payment card (also known as a financial transaction card), merchant 104 requests authorization from acquirer 106 (including processor 106a and memory 106b) for the amount of the purchase. Such a request is referred to herein as an authorization request message (e.g., ISO® 8583 compliant messages and ISO® 20022 compliant messages). The request may be performed over the telephone, but is usually performed through the use of a point-of-interaction terminal, which reads the cardholder's account data 102c from a magnetic stripe or chip on the payment card and communicates electronically with the transaction processing computers of acquirer 106. Point-of-interaction terminals include point-of-sale (POS) devices 104c, ATM devices 104d, and remote transaction devices 104e that are associated with merchant 104. Alternatively, acquirer 106 may authorize a third party to perform transaction processing on its behalf. In this case, the point-of-interaction terminal will be configured to communicate with the third party. Such a third party is usually called a "merchant processor" or an "acquiring processor."

For card-not-present (CNP) transactions, cardholder 102 provides payment information or billing data associated with the payment card electronically (e.g., via cardholder client device 102b and/or remote transaction device 104e) to merchant 104. The payment information received by merchant 104 is stored and transmitted to acquirer 106 and/or payment network 108 as part of an authorization request message. In some embodiments, merchant 104 transmits a plurality of authorization request messages together as a "batch" file to acquirer 106 and/or payment network 108.

Using payment card system payment network 108, the computers of acquirer 106 or the merchant processor will communicate with the computers of issuer 110, to determine whether the cardholder's account 112 (provided by issuer 110) is in good standing and whether the purchase is covered by the cardholder's available credit line or account balance. Based on these determinations, the request for authorization will be declined or accepted. If the request is accepted, an authorization code is issued to merchant 104.

When a request for authorization is accepted, the available credit line or available balance of cardholder's account 112 is decreased. Normally, a charge is not posted immediately to a cardholder's account because bankcard associations, such as Mastercard International Incorporated, have promulgated rules that do not allow a merchant to charge, or "capture," a transaction until goods are shipped or services are rendered. When a merchant ships or delivers the goods or services, merchant 104 captures the transaction by, for example, appropriate data entry procedures on the point-of-interaction terminal. If a cardholder cancels a transaction before it is captured, a "void" is generated. If a cardholder returns goods after the transaction has been captured, a "credit" is generated.

For debit card transactions, when a request for authorization is approved by the issuer, cardholder's account 112 is decreased. Normally, a charge is posted immediately to cardholder's account 112. The bankcard association then transmits the approval to the acquiring processor for distribution of goods/services, information, or cash in the case of an ATM.

After a transaction is captured, the transaction is settled between merchant 104, acquirer 106, and issuer 110. Settlement refers to the transfer of financial data or funds between the merchant's account, acquirer 106, and issuer 110 related to the transaction. Usually, transactions are captured and accumulated into a "batch," which is settled as a group.

The financial institutions represented in FIG. 1 as payment card issuers, acquiring banks, or merchant banks in many cases are also mortgage issuers, mortgage holders or real estate investment holders. At present, such financial institutions have working relationships in the payment card space, but not so much in the mortgage space. The systems and methods described below in part leverage some of the payment card banking relationships to create relationships in the mortgage space and foster cooperative management of mortgage asset portfolio risks and complete mortgage aspect transfers using the payment card processing system 100. As such, and for the remainder of the present description, the "cardholder" 102 or customer in FIG. 1 may be a first financial institution and the "merchant" may be a second financial institution conducting a transaction for a mortgage portfolio asset as described next. Alternatively, the payment system 100 may process account to account transfer of funds that are not necessarily payment card accounts.

Figure 2:
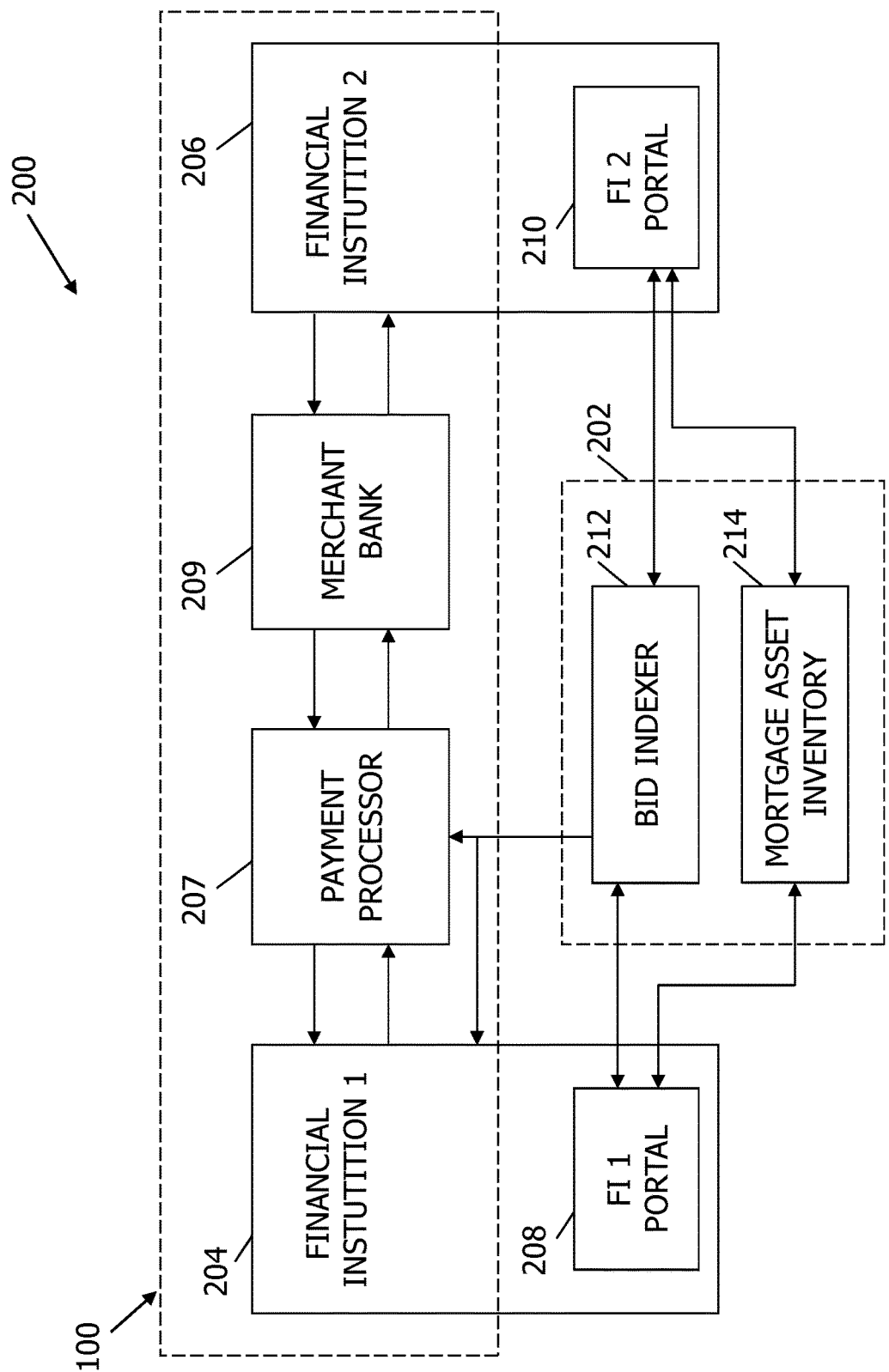
FIG. 2 is a schematic diagram illustrating an exemplary online mortgage portfolio asset auction system that is operative with the payment processing network system shown in FIG. 1 in one embodiment.
Figure 3:
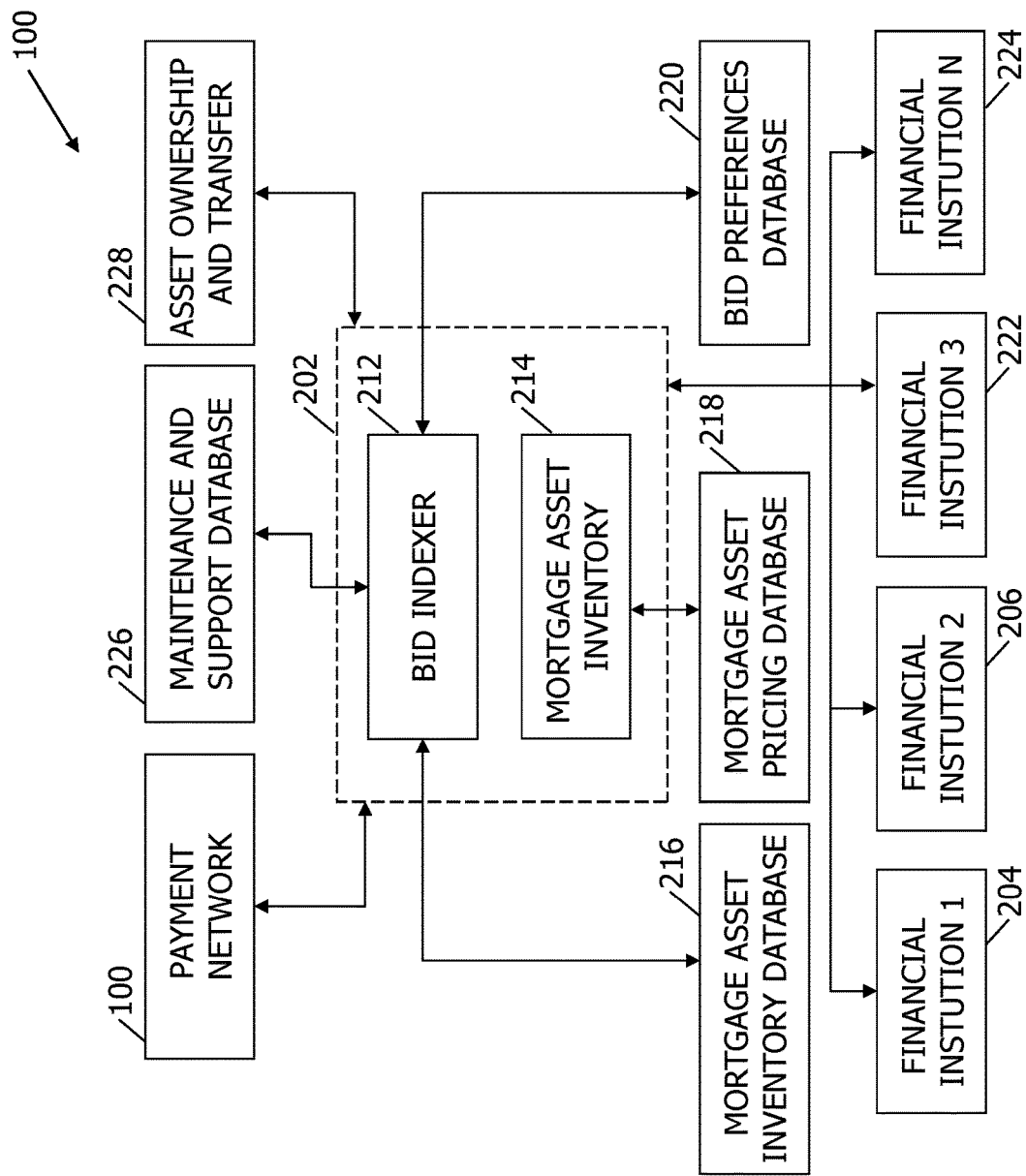
FIG. 3 illustrates an operational schematic diagram for the mortgage portfolio asset auction system shown in FIG. 2.

FIG. 2 is a schematic diagram illustrating an exemplary online mortgage portfolio asset auction system 100. FIG. 3 is an operational schematic diagram of the online mortgage portfolio asset auction system 100.

The online mortgage portfolio asset auction system 200 includes a host mortgage asset auction computing device 202 in communication with payment system 100 to facilitate a mortgage asset transaction between a first financial institution 204 and a second financial institution 206 for a mortgage portfolio asset transfer that may be paid for via a payment processor 207 and a merchant bank 209 in the payment system 100 or via account to account transfer between financial institutions. The first financial institution 202 is referred to herein as a bidding institution 204 conducting a transaction with the second financial institution 206 offering a mortgage portfolio asset for sale.

The host mortgage asset auction computing device 202 is in communication with an first portal 314 allowing the first financial institution 202 (the bidding financial institution) to input bid orders, and is also in communication with a second portal 210 allowing the second financial institution 206 to input mortgage portfolio assets that the first financial institution 202 may consider when the mortgage portfolio assets of the second financial institution 206 meet the criteria of a bid placed by the bidding financial institution 210.

The host mortgage asset auction computing device 202 in the example shown in FIG. 2 includes two main components, namely a bid indexer component 212 and a mortgage asset inventory component 214. The components 202 may be different components of the computing device 202 or may be different computing devices in contemplated embodiments. The mortgage asset inventory component 214 accepts or collects mortgage portfolio access data from the second financial institution 206 via the portal 210. For example, the second financial institution 206 may have a number of mortgage assets such as foreclosed properties in its mortgage portfolio that the second financial institution 206 wishes to make available for bids via the host mortgage asset auction computing device 202. That is, the second financial institution 206 offers selected mortgage assets (e.g., foreclosed properties) for sale and makes them available to the mortgage asset inventory component 214.

In different embodiments, the second financial institution 206 supplies the mortgage asset data to the mortgage asset inventory component 214 or the mortgage asset inventory component 214 retrieves the mortgage asset data from a system of the second financial institution 206. Either way, the mortgage asset data is received by the mortgage asset inventory component 214. The received mortgage asset data is added to a mortgage inventory database 216 as shown in FIG. 3. Optionally, the received mortgage asset data may be at least partly verified by the mortgage asset inventory component 214 before adding it the mortgage inventory database 216.

For example, the asking price for a mortgage asset may be compared to pricing data of similar properties in a mortgage asset pricing database 218 as one measure of authenticity. Excessive deviation in asking price relative to market data for nearby properties or other public data may indicate mistaken data or possible fraudulent use of the system 100. Address information for received mortgage data could also be verified, and publicly available property tax information may supply other ways to verify mortgage asset data. Data that cannot be satisfactorily verified can be rejected by the mortgage asset inventory component 214 to ensure the integrity of the data in the mortgage inventory database 216. The mortgage inventory database 216 may optionally send a notice to the second financial institution 206 with appropriate explanation of the reasons for rejection and may invite the second financial institution 206 to resubmit the data.

The bid indexer component 212 accepts or collects a bid order from the first financial institution and accesses the mortgage inventory database 216 to locate corresponding mortgage assets to any given bid orders. The bid indexer component 212 also applies preference algorithms and rules that are stored in a bid preference database 220 that facilitate an efficient identification of the most desirable mortgage assets from the mortgage inventory database 216 as described further below. As shown in FIG. 3, the host mortgage asset auction computing device 202 communicates not only with the financial institutions 204 and 206, but also a third institution 224 up to the nth institution 226. The number n of participating institutions is practically unlimited, and generally considering that the number of assets in a mortgage portfolio of some of the participating institutions may be quite high, the available mortgage inventory in the mortgage asset inventory database at any point in time may represent a very large number, and when a number of regional, national, and international banking institutions are represented as participating institutions the auction system 100 may be truly global in nature allowing mortgage assets and asset properties worldwide to be auctioned in a highly efficient manner. Any of the n participating financial institutions may offer mortgage assets for sale and bid for mortgage assets offered for sale.

The host mortgage asset auction computing device 202 may operate more or less continuously to receive updated or newly available mortgage asset data and to match bid orders against the updated mortgage inventory. Alternatively, the mortgage asset inventory may be updated and bid orders may be received at regular and recurring intervals (e.g., daily at a predetermined time or weekly on a predetermined day and time). Alerts, messages and notifications can be automatically generated to the participating financial institutions to prompt new mortgage assets to be offered for sale, to prompt bidders to make bid orders, to announce incentives or specials, or for general informational purposes regarding updates, newly added features and options, etc.

The system 100 includes a maintenance and support database 226 that collects data on system operation, provides for system analysis and troubleshooting, and maintains records of errors, maintenance events and procedures, software revision dates and notes, etc. An asset ownership and transfer component or database 228 is also provided that may perform transfer and ownership tasks and record keeping requirements. The asset ownership and transfer component or database 228 may implement smart contract features including one or more terms for a real estate purchase contract and/or other real estate transfer documents using a blockchain structure.

In one aspect, financial institutions are enrolled as participating members on the system 100 to offer mortgage assets for sale and/or bid on mortgage assets offered for sale by another participating institution. The enrollment includes acceptance of preferences by each enrolled institution for possible transactions in which they are the seller of mortgage assets or the buyer of the mortgage assets. The system and method of the disclosure is operative to collect or accept mortgage asset information from each of the participating financial institutions, make mortgage assets (e.g., foreclosed properties) available for bids by any of the participating financial institutions by building a mortgage asset inventory inclusive of all mortgage assets being offered by any of the participating financial institutions, evaluate bids against the mortgage asset inventory and identify the most desirable ones of the mortgage assets for each bid, and accept bids according to the applicable preferences and options for the institutions involved. Such preferences may include payment authorizations, transfer of funds, and ownership transfer preferences. Additionally, accepted preferences may include bid order customization items such as Geospatial preferences, related transfer options, and bulk purchase parameters at preset, recurring intervals or standing orders for mortgage assets that meet desired criteria. Bulk purchase orders may be eligible for flat rate and bid preferences in the operation of the systems and methods.

In another aspect, the system 100 provides a mortgage inventory feed that facilitates information exchange and evaluation of bids by participating financial institutions for mortgage assets made available for bids. This can be done institutionally by each mortgage issuer or mortgage holder in the participating financial institutions to create a mortgage asset inventory including mortgage assets offered by multiple mortgage issuers or mortgage holders that can be collectively considered for indexing and matching with bids from other participating financial institutions. The mortgage inventory feed may include mortgage asset details such as property size (i.e., square footage), property value, mortgage loan amount, tenure, residential or commercial property descriptors, asking price, or other information that is desired for indexing and matching mortgage assets to potential bids and bidders. In different embodiments, the mortgage inventory feed may include accepting mortgage asset information from participating institutions via the system, or the system retrieving the mortgage asset information from a system of a participating institution. Verification rules may be implemented to check for the genuineness of mortgage asset information before it is added to the mortgage inventory feed. For example, the loan amount may be compared against the property value as a check on incoming mortgage asset data, and may form a basis to accept or deny mortgage asset information.

In another aspect, participating institutions are provided access to the mortgage inventory feed and may review mortgage assets according to preferences and options selected by each institution and applied as filters to the mortgage inventory feed in order to locate desirable mortgage assets. For example, while placing an order for mortgage assets an institution may select a preference for contactable or contactless mortgage issuers, input price range selections and values, select recurring orders to be placed at static current prices, or select a preferred credit payment facility to complete a mortgage asset transfer.

In the system 100, bid orders are received from participating financial institutions for property assets made available via the inventory of available mortgage assets. Bid orders and mortgage assets may be categorized into one or more groups in the system 100 to match bids and assets that are most likely to result in a completed transaction. For example, groups may be created based on bid priority and/or asset priority. A high priority group may include available mortgage assets against which a bid order is placed. A medium priority group may include bid orders mortgage assets that are not actually available but in which similar mortgage assets are available for bidding. A low priority group may include future bid orders for mortgage assets. Also, options to prioritize items in a bulk order may be presented.

The systems and methods of the disclosure interact with the overall universe of participating financial institutions in more or less real time to fetch and index updated inventory including newly available mortgage assets and/or updated bids for mortgage assets being placed by the participating financial institutions for purchase and transfer. If bid updates are not received from the participating financial institutions, the system 100 will re-index the last submitted bid orders and apply to the filters to locate matching assets according to the applicable filters and user preferences. Daily or weekly reports may be submitted to the participating financial institutions including mortgage assets that meet the designated criteria of the received bid orders.

In one aspect of the system 100, in response to received bid orders, a financial institution ranking for matching property assets to bids may be generated. For example, a rank or overall score can be determined from the following relationship:

$$\Sigma W_i * F(P_i)) / \Sigma W_i$$

where $W_i$ is a weighting factor and $P_i$ is a corresponding financial institution preference ranking parameter. A variety of different weighting factors $W_i$ through $W_n$ may be used with different ranking parameters $P_i$ through $P_n$ to deliver the most desirable property asset results to bidding financial institutions with the highest scored assets being presented first.

For instance, a first preference ranking parameter $P_1$ may indicate by financial institution an availability of at least a pre-defined percentage (e.g., 75%) of high priority items. The pre-defined percentage may be determined by the system and method of the disclosure itself, be statistically based or calculated in view of system usage, or may be user defined and selectable by institutions placing bid orders. In some embodiments, financial institutions having a property asset availability percentage below the pre-defined percentage of high priority items may be excluded from further consideration by a bidder.

In another aspect, a second preference ranking parameter $P_2$ is set or selected by a bidding financial institution as mortgage assets are located as a type of refined searching or filtering tool to obtain more optimal results from the system. As such, the bidding financial institution may specify weighting and institution parameter criteria. The bidding financial institution may adjust the weights and parameter criteria and see how they may change the results toward a goal of finding the most desirable mortgage assets of desired institutions offering them while excluding others.

In another aspect, a third preference ranking parameter $P_3$ reflects a prior purchase history of the bidding financial institution with the financial institution offering a matching mortgage asset to a bid order. Frequency and regency are sub-parameters relating to the prior purchase parameter. Frequency indicates a number of transactions completed by the bidding financial institution with the financial institution offering a matching mortgage asset, and recency indicates a number of transaction completed in a predetermined period of time (e.g., in the last three months). As such, financial institutions offering a matching mortgage asset having a more extensive priory purchase history will be ranked higher than financial institutions having little to no prior purchase history with a bidding financial institution.

In another aspect, a fourth preference ranking parameter $P_4$ may indicate a subjective affinity of a bidding financial institution user for certain financial institutions offering a matching mortgage asset. For example, a bidding financial institution user may like to work with some financial institutions but not others, or may enter in formal or informal preferred partnerships or arrangements. As such, and for example, $P_4$ may be a user selectable value from 1 to 10, with 1 indicating little or no interest in property assets of a particular financial institution and 10 indicating strong interest in property assets of the same institution. Accordingly, mortgage asset results for an issuer with a "10" rating will be scored more highly than mortgage asset results having a "5" rating, and mortgage asset results for an issuer with a "5" rating will be scored more highly than mortgage asset results having a "1" rating.

The system 100 assigns weightage to each of the parameters $P_1$ through $P_4$ in order to create a single score value for each of the participating financial institutions having available mortgage assets in the bidding scenario. The system and method may allow a user to adjust the weights to provide further variation in scores. The system and methods of the disclosure provides a ranked order list of the available property institutions based on the overall score calculated and other price related factors and considerations for the available mortgage assets. When the ranked order list is displayed to the bidding financial institution, the best or most preferred deals for available mortgage assets are listed first. The rank order list can be displayed in different formats as desired.

After reviewing the ranked order list, the bidding financial institution may further select the appropriate mortgage assets on the list for acceptance to complete the acquisition of the mortgage assets. The payment for accepted items may be executed over the systems and method of the disclosure, or by other payment processing systems and methods. Single click acceptance and payment of selected mortgage assets is possible.

The system 100 may also generate a ranked order list of available mortgage assets matching a bid order based on the asking prices for the mortgage assets held by each financial institution that match a bid order. As such, a separate list from the preferred issuer list described above is generated with the lowest priced mortgage assets ranked higher than more expensive ones. This list is then compared with the previous list discussed above based upon institution preferences to identify mortgage assets and or financial institutions that appear in the "top ten" entries of each of the two lists generated. If a single common entry on the two lists is found, the order can be accepted and payment may be processed to complete the transaction. In some embodiments, the acceptance may be automatically undertaken by the system without further input by either of the bidding financial institution or the financial institution making the mortgage asset available.

If there is more than common entry in the top ten entries on each of the two lists generated, then a revised ranking for each institution in the preferred institution list is determined. When revised, the institutions are ranked in increasing order of the difference between the asking price offered by that institution and the lowest asking price in the ranked price list. The institution with the lowest price differential may be selected and payment may be processed to complete the transaction. Alternatively, other forms or revised rankings may be generated to obtain the best deal but still abide by the preferences of the bidding institution.

If no common entry is identified in the two lists then the next ten entries in each list may be considered until a single common entry is identified in the two lists or revised rankings can be generated as discussed above to obtain the best deal but still abide by the preferences of the bidding institution.

In another aspect, the system 100 may generate weights, scores and ranking lists based on usage data from the system and recommend available mortgage assets presenting optimal value for each of the bidding financial institutions. The system 100 and methods of the disclosure may communicate with the participating financial institutions regarding newly available mortgage assets in the inventory, and any applicable incentives, discounts or special offerings for available mortgage assets in the inventory.

In some embodiments, a bidding institution may also indicate a tolerance band preference for one or more of the participating financial institutions making mortgage assets available. For example, a bidding financial institution may indicate a percentage that the bidding financial institution is willing to pay above the lowest priced mortgage asset in the ranked pricing list in order to do business with a particular institution or institutions. For example, in a contemplated example of tolerance bands, a bidding financial institution that is loyal to financial institution 1 may choose to pay 5% over for the asking price in order to obtain a mortgage asset offered by financial institution 1, while the same bidding financial institution may opt to pay only 3% over for the asking price in order to obtain a mortgage asset from financial institution 2, and also while choosing to offer no other financial institution more than the asking price of their respective mortgage assets.

Similarly, when bids are received from bidding financial institutions, the system 100 and methods of the disclosure could, based on prior transaction data, prompt a communication to one of the financial institutions offering a mortgage asset to see whether there is loyalty to one or more of the other participating financial institutions and based on such loyalty whether pre-configured benefits are desired to offer to one or more of the bidding institutions to bid on mortgage assets that are being offered. The financial institution offering a mortgage asset may configure different benefits or incentives to different bidding financial institutions based on loyalty and other considerations. This type of incentive generation may be undertaken automatically according to profiles and preferences of financial institution offering mortgage assets.

Figure 4:
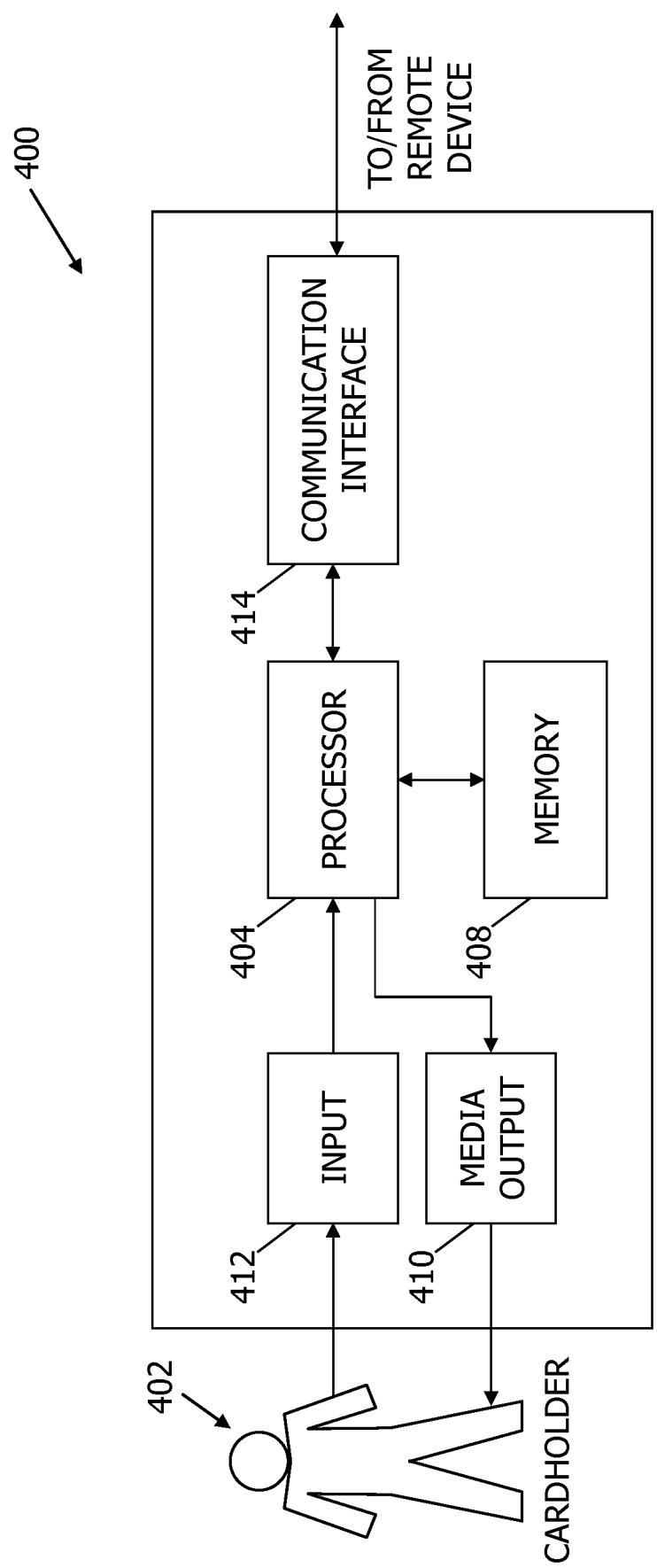
FIG. 4 illustrates an example configuration of a user device for the system shown in FIGS. 2 and 3.

FIG. 4 illustrates an example configuration of a device 400 operated by a user 402, such as any of the parties described above in relation to the online mortgage portfolio asset auction system 100. User device 400 may include, but is not limited to, a smart phone, a tablet, a notebook or laptop computer, a desktop computer, and a website. In the example embodiment, device 400 includes a processor 404 for executing instructions. In some embodiments, executable instructions are stored in a memory area 408. Processor 404 may include one or more processing units, for example, a multi-core configuration. Memory area 408 is any device allowing information such as executable instructions and/or written works to be stored and retrieved. Memory area 408 may include one or more computer readable media.

The device 400 may also include at least one media output component 410 for presenting information to user 402. Media output component 410 is any component capable of conveying information to user 402. In some embodiments, media output component 410 includes an output adapter such as a video adapter and/or an audio adapter. An output adapter is operatively coupled to processor 404 and operatively couplable to an output device such as a display device, a liquid crystal display (LCD), organic light emitting diode (OLED) display, or "electronic ink" display, or an audio output device, a speaker or headphones.

In some embodiments, the device 400 includes an input device 412 for receiving input from user 402. Input device 412 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 410 and input device 412. The device 400 may also include a communication interface 414, which is communicatively couplable to a remote device in the system and network described above or with other remote devices and networks. Communication interface 414 may include, for example, a wired or wireless network adapter or a wireless data transceiver for use with a mobile phone network, Global System for Mobile communications (GSM), 3G, or other mobile data network or Worldwide Interoperability for Microwave Access (WIMAX), or an 802.11 wireless network (WLAN).

Stored in memory area 408 are, for example, computer readable instructions for providing a user interface to user 402 via media output component 410 and, optionally, receiving and processing input from input device 412. A user interface may include, among other possibilities, a web browser and client application. Web browsers enable users, such as user 402, to display and interact with media and other information typically embedded on a web page or a website. An application allows user 402 to interact with a server application from a server system.

Multiple user devices 400 are contemplated and respectively provided for use by representatives bidding financial institutions and financial institutions offering properties for sale, representatives of the payment processor, or representatives of the merchant bank, and possibly others to effect the system 100 as shown in FIGS. 2 and 3. Additional and/or alternative users and user devices may be provided, however, as desired for use with the system.

In a variety of contemplated examples, different combinations of user devices, being the same or different from one another, may be utilized in the system with otherwise similar effect. One or more of the user devices may be a mobile device, such as any mobile device capable of interconnecting to the Internet including a smart phone, personal digital assistant (PDA), a tablet, or other web-based connectable equipment. Alternatively, one or more of the user devices may be a desktop computer or a laptop computer. Each of the user devices may be associated with a different user as described. Each user device may be interconnected to the Internet through a variety of interfaces including a network, such as a local area network (LAN) or a wide area network (WAN), dial-in connections, cable modems and special high-speed ISDN lines.

Figure 5:
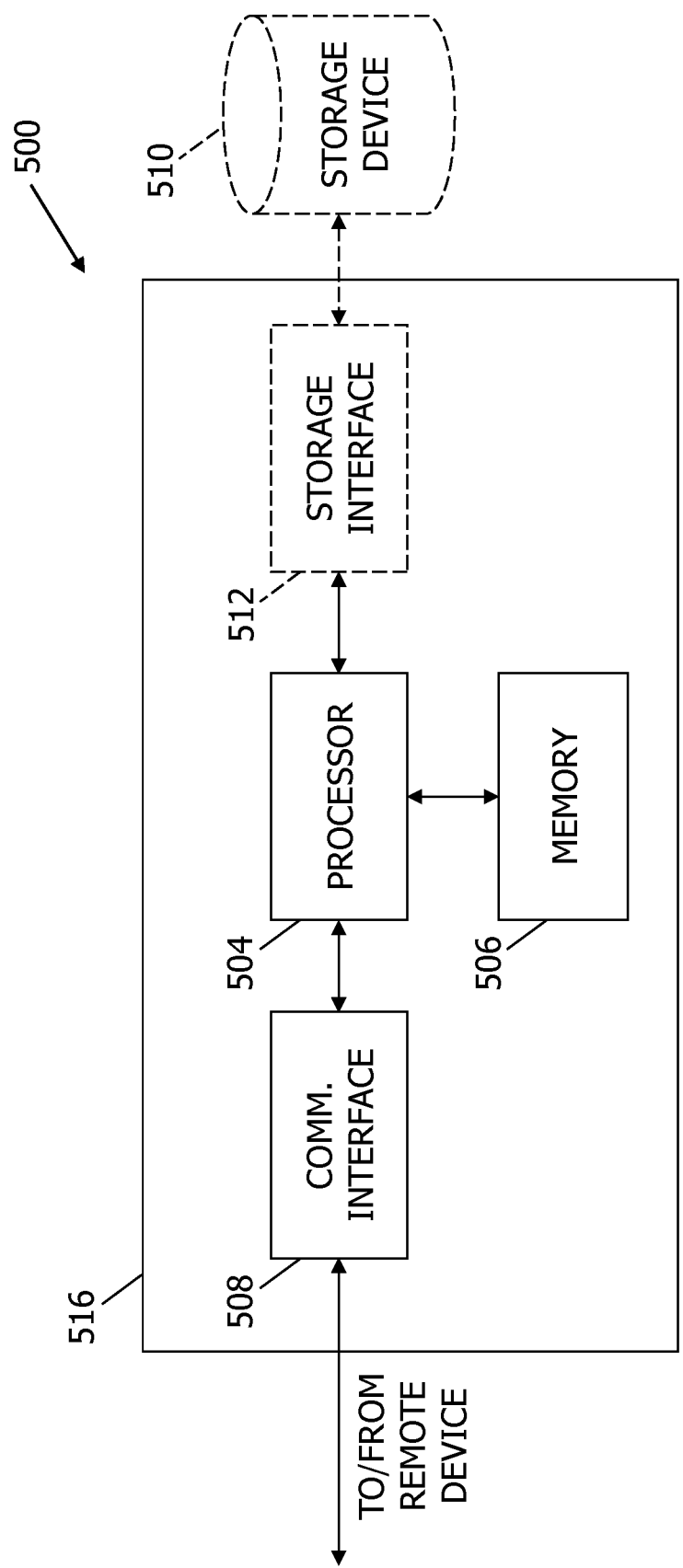
FIG. 5 is a schematic diagram of an example server computing device that may be used with the computer system shown in FIGS. 2 and 3.

FIG. 5 illustrates an example configuration 500 of a host mortgage asset auction computing device 516 that may be used as the host device 202 as shown and described above in relation to FIGS. 2 and 3 the provides mortgage asset inventory management and bid indexing to identify desirable mortgage assets in relation to a bid order of a financial institution. The computing device 516 is sometimes referred to herein as a server-based network "host" device that manages the asset auction operations and interfaces with the financial institutions involved.

As shown in FIG. 5, the host mortgage asset auction computing device 516 includes a processor 504 for executing instructions. Instructions may be stored in a memory area 506, for example. Processor 504 may include one or more processing units (e.g., in a multi-core configuration).

Processor 504 is operatively coupled to a communication interface 508 such that host mortgage asset auction computing device 516 is capable of communicating with a remote device such as a the portals 208, 210 and any of the databases or components described above in relation to FIGS. 2 and 3. For example, communication interface 508 may receive or transmit mortgage asset data, bid order data for mortgage assets, identified mortgage assets and scores, ranked lists of assets, an asset recommendation, payment data or other communications with the portals, components and databases described above in the system 100.

Processor 504 may also be operatively coupled to a storage device 510. Storage device 510 is any computer-operated hardware suitable for storing and/or retrieving data. In some embodiments, storage device 510 is integrated in the host mortgage asset auction computing device 516. For example, host mortgage asset auction computing device 516 may include one or more hard disk drives as storage device 510. In other embodiments, storage device 510 is external to host mortgage asset auction computing device 516 and may be accessed by a plurality of server computer devices. For example, storage device 510 may include multiple storage units such as hard disks or solid state disks in a redundant array of inexpensive disks (RAID) configuration. Storage device 510 may include a storage area network (SAN) and/or a network attached storage (NAS) system.

The storage device 510 may include a database server and database which contains information and transaction data for enrolled participating financial institutions. In one embodiment, the database is centralized and stored on the server system 500. In an alternative embodiment, the database is stored remotely from the server system 500 and may be non-centralized. The database may store mortgage asset data, preference data, mortgage asset transfer data, pricing data and other data needed for the auction system 100 to operate with respect to mortgage assets provided and bid orders received.

In some embodiments, processor 504 is operatively coupled to storage device 510 via a storage interface 512. Storage interface 512 is any component capable of providing processor 504 with access to storage device 510. Storage interface 512 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 504 with access to storage device 510.

Memory area 506 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 6:
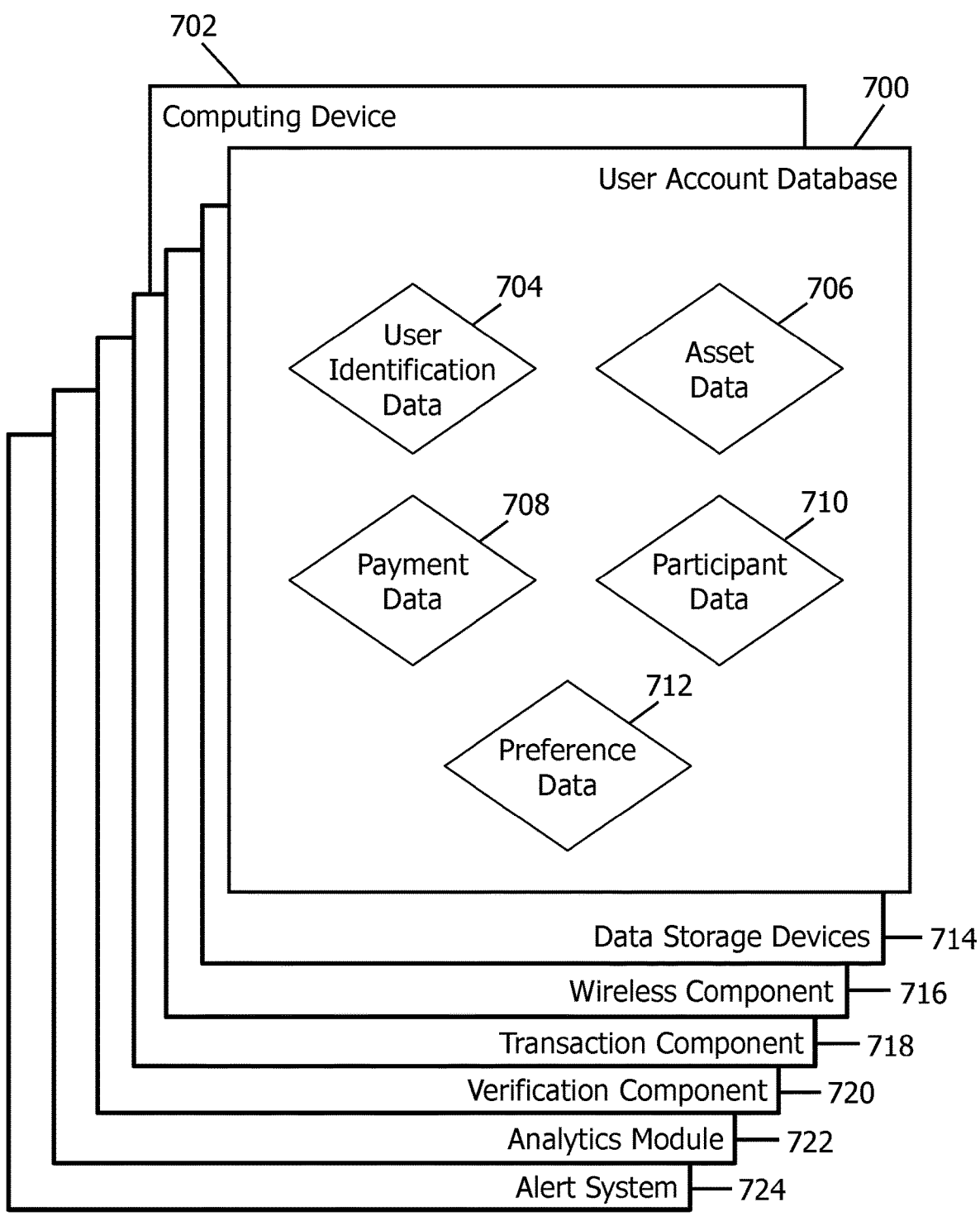
FIG. 6 shows an example configuration of a user account database within a computing device, along with other related computing components, that may be used to create, organize, and monitor a plurality of user data associated with a user.

FIG. 6 shows an example configuration of a user account database 700, within a computing device 702, along with other related computing components, that may be used to create, organize, and monitor a plurality of user data associated with a user account. In some embodiments, computing device 702 is the same or similar to server system 500. User account database 700 is coupled to several separate components within computing device 702, which perform specific tasks.

In the example embodiment, database 700 includes user identification data 704, mortgage portfolio asset data 706, payment data 708, participant data 710, and preference data 712. In contemplated embodiments, user identification data 704 includes, but is not limited to, a user name, a user address, and a user phone number. Mortgage portfolio asset data 706 includes data associated with mortgage asset inventory assembly and creation, pricing data, filtering of data to identify mortgage assets in relation to a bid order, communication of ranked asset lists, and ownership and transfer tasks for completed mortgage asset transactions. Payment data 708 includes, but is not limited to, card information, payment history, and a billing address. Participant data 710 includes information associated with participating merchants, including merchant identifiers, address information, contact information, etc. Preference data 712 includes data associated with financial institutions preferences and weights needed to score identified assets and create ranked asset lists.

Computing device 702 includes the database 700, as well as data storage devices 714. Computing device 702 also includes a wireless component 716 and a transaction component 718 for correlating, for example, payment card transactions. An analytics module 722 is included for analyzing mortgage asset transactions, enrollment status, the mortgage asset data and filtering described herein, time to complete indexing and filtering of bids to provide results, success or failure rates of proposed transactions including identified mortgage assets, and other items of interest. Further included is a verification module 720 that may communicate with a device in the payment network or another device, and an alert module 724 for transmitting an alert to any interested party concerning the operation of the auction system.

FIG. 7 shows an exemplary process 800 of auctioning mortgage assets with the systems and devices shown in FIGS. 1-6. In the example shown, the process 800 is implemented by the host mortgage asset auction computing device in communication with the multi-party payment processing system and network as explained below. The process 800 includes one or more unconventional steps vis-a-vis existing auction systems for mortgage assets or other types of property.

At step 802 the participating financial institutions are enrolled and preferences such as those described above are submitted by each participating institution. Enrollment of the institutions may also include account creation, account id creation, password and login establishment, payment authorizations and payment processor preferences, etc. Non-enrolled institutions cannot gain access to the system in contemplated embodiments, such that the auctioning of mortgage assets is conducted on a private network between approved and reputable institutions and a degree of confidentiality for the data being exchanged. Publicly available networks and systems could alternatively be provided, however, if desired.

At step 804, mortgage asset information is accepted from each participating institution. The acceptance may include mortgage asset data supplied by participating merchants, or mortgage asset data retrieved from participating merchants. The mortgage asset data may include loan assets and foreclosed property assets.

At step 806, the accepted mortgage asset information is verified by comparing the information accepted to other records and information. If verified, the accepted mortgage asset information is added to the mortgage asset inventory at step 806. Mortgage asset information that is not sufficiently verified may be rejected, and the associated financial institution may receive a notification concerning the same. The acceptance step 804 and verification step 806 are performed iteratively by the system either continuously or at predetermined time intervals such that the inventory 808 being assembled is current and accounts for newly offered mortgage assets as they are being introduced. In contemplated embodiments having high numbers of participating institutions, the mortgage inventory is dynamic in nature.

At step 810, a mortgage asset query is accepted in the form of a bid order from one of the participating financial institutions. The bid query or bid order includes mortgage asset criteria upon which a mortgage asset may be identified. For example, and considering the scenario of foreclosed property assets, the bid order may specify a commercial office property having at least 8000 square feet with price up to $1,000,000 or a residential property having four bedrooms, up to $3,500 square feet and price of $450,000. Geospatial preferences (e.g., country, region, state, county, municipality, zip code) may be included. Considerable variation is possible in this regard. The bid orders may be as broad or as specific as the bidding institution desires within the operational constraints of the system. It is understood that multiple bid orders may be received from the same or different bidding institutions at about the same or different times. Standing orders may be placed that will be iteratively processed by the system. Bulk orders may also be received.

At step 812, the bid filters are applied to identify assets that satisfy the bid criteria and the applicable preferences. For example, if the bid criteria specifies a residential property having four bedrooms, up to $3,500 square feet and price of $450,000 the system operates to exclude commercial properties, to exclude residential properties having three or fewer bedrooms and to exclude residential properties having more than 3500 square feet or an asking price above $450,000. The preference criteria will then operate to further filter the assets satisfying the bid criteria.

At step 814, a list of property assets that results from the filtering of the mortgage asset inventory is presented to the institution that submitted the query. At this point, the institution may adjust the query and the applicable weights and filters to see how the results may change to gain a better understanding of how the filters work. The institution may refine their queries and preferences in order to make optimal bids that include similar queries and preferences.

At step 816, the institution now submits an actual bid order, and the system proceeds at step 818 to index the bid order in combination with other bid orders by the same or different institution. At step 820, issuer rankings and scores for assets identified via the bid filters and preference filters are calculated or otherwise determined, and at step 822 the identified mortgage assets are organize in ranked lists as determined by the applicable issuer preference criteria, weights and scores and described above to generate one or more ranked lists of property assets for review by a bidding institution.

At step 822, the ranked lists are displayed to the bidding institution for review and final decision whether to acquire one or more of the assets listed. The ranked lists represent the most desirable mortgage assets available in view of the bid order and preference criteria. One or more mortgage properties may also be specifically identified as recommended mortgage assets to acquire in view of the analysis performed by the system.

At step 824 the order may be accepted for one or more of the assets listed, and at step 826 payment may be accepted. Transfer of assets may be completed at step 828, including tasks such as deed creation, closing documents and settlement papers, assignments, etc. needed to perfect title in the assets being transferred.

For purposes of bid order generation and steps 824, 826 and/or 828 digital contracts can optionally be generated by the system and digitally signed between the financial institutions in mortgage asset purchases made via the system in a highly efficient and convenient manner to the financial institutions involved. Virtual or electronic smart contracts may be automatically generated with terms and conditions and stored in blockchain ledger form. Blockchain-based peer to peer networks may effect and record asset transfers using a blockchain structure for enhanced security.

More specifically, a blockchain is a distributed database that maintains a continuously-growing list of ordered records, known as blocks. The host mortgage asset auction computing device may include or may access one or more blockchain node computing devices of a blockchain network providing a blockchain ledger in which mortgage asset acquisition information is stored. Each blockchain node computing device stores a local, complete copy of the ledger as a plurality of blockchains. Each blockchain may include a sequence of one or more blocks, wherein each block is cryptographically verifiable and enforces a chronological order of data stored in subsequent blocks.

The blockchain network may function as a platform for storage of mortgage asset information. The blockchain network may further function to store smart contracts that execute upon satisfaction of one or more execution criteria. Each smart contract may be based upon the blockchain structure, and may include all of the information about the mortgage asset transfer as well as mortgage asset data to link the smart contract to a first blockchain. The smart contract may be stored in a plurality of locations including the mortgage asset computing device, a database, and/or the blockchain network itself. The smart contract may be transmitted to the first blockchain node computing device for storage and distribution to the plurality of other blockchain node computing devices in the blockchain network to update their local copies of the first blockchain with the smart contract.

The execution criteria for each smart contract may be set forth in the bid orders of bidding financial institutions as described above, and are satisfied, in some embodiments, upon acceptance of the smart contract by the bidding institutions for particular mortgage assets offered for sale on the auction system. The smart contract may automatically assembly and populate mortgage asset transfer terms, conditions and provisions including identifying information and description for the mortgage loans or mortgage properties being transferred, identifying information concerning the financial institutions that are parties to each transaction, consideration (purchase amount), date information, representative and signature information for each financial institution, and other information required to create a binding contractual obligation to transfer mortgage assets. Smart contracts may be presented for electronic acceptance or execution by the acquiring financial institutions. Execution of the smart contracts by participating financial institutions may automatically trigger a transfer of payment funds and/or a transfer of a title or other ownership document associated with the mortgage assets acquired.

It will be understood or contracted by applicable terms and conditions that the financial institutions would be obliged to submit real estate purchase contracts and other documents to applicable regulatory authorities or agencies to meet reporting requirements, recordation requirements and/or to perfect title in acquired assets. Likewise, copies of contracts and documents may be automatically supplied by the host mortgage asset auction computing device to applicable regulatory authorities and agencies. Otherwise, contracts or documents generated by the system are managed and secured as private documents.

In each blockchain, one or more blocks may include a first block representing a first mortgage asset transaction. Also in each blockchain, additional or subsequent blocks may also be included, wherein each subsequent block after the first block includes a description of data stored in the immediately previous block and/or a link to the previous block. Subsequent blocks in a blockchain may include contract information or ownership information associated with mortgage asset transactions conducted in the mortgage asset auction system. The same mortgage loans or mortgaged properties may be transferred among the financial institutions any number of times, with each transfer being recorded in blocks in the blockchains.

In each blockchain, the description of data stored in the previous block and/or the link to the previous block may include a hash of data stored in the previous block. The hash (which may be referred to as a "hash value") may be generated by executing a hashing function on the data stored in the previous block. This continues on, with each block adding on to the next while containing a hash of the previous block(s) in the blockchain. In this way, the chronological series of data stored in a single blockchain may be verifiable and immutable.

Copies of the blockchain may be distributed across multiple blockchain node computing devices, sometimes simply referred to as "nodes", to ensure the security of the information contained in the blockchain. The blockchain is maintained and updated at each node when changes occur to ensure the integrity and stability of the information stored in the blockchain. Nodes may also calculate the hash of the previous blocks, and as the blockchain grows, the processing power needed to calculate the hash of the previous blocks increases. The processing of the hash may accordingly be distributed over multiple notes to increase the processing speed and/or to avoid overburdening the hashing processor of any particular node. A node processes (hashes) a block is referred to as a miner, and the action of validating and hashing the block referred to as mining.

Data stored in a block of a blockchain may likewise be encrypted using any suitable encryption process(es) for further security of the data stored therein. Access to a public key, whether included in a block or otherwise provided, enables decryption of encrypted data stored in the block. In some instances, a public key may be securely distributed to access computer device(s) that are verified to have entitlement access to the data within a block and/or within the blockchain network.

A request for information from a first blockchain of the plurality of blockchains may be made to a node by the mortgage asset auction computing device, or by another computing device as desired, including a mortgage asset identifier associated with a mortgage asset. A query may likewise be transmitted including a mortgage asset identifier, causing the node to identify a last block in the first blockchain, wherein the last block includes an encryption of existing mortgage asset information for the identified asset(s). Encrypted mortgage asset information may be returned from the node, and may be decrypted using a public key. The decrypted information may provide yet another way to verify mortgage asset information accepted by the system. The existence of the asset and its current ownership may be confirmed via the blockchain data, with the mortgage asset auction computing device comparing the ownership information and mortgage asset information to the offering institution and information accepted from the offering financial institution.

Upon receiving an acceptance notification indicating acceptance of a smart contract transferring a mortgage asset to another financial institution, the mortgage asset auction computing device, or another device as desired, may automatically transmit an update instruction to one or more of the blockchain nodes. The update instruction may include an encryption of mortgage asset transfer information and/or may cause the blockchain node to encrypt the mortgage asset transfer information. The update instruction may cause the blockchain node computing device to generate and store a new block subsequent to the last block. The new block includes the encryption mortgage asset transfer information and a description of data stored in the last block (e.g., a hash of the last block).

Automation of the mortgage asset transfer documentation via a blockchain network avoids human error while dramatically reducing the timeframe to complete a mortgage asset transaction, and also while avoiding certain time delays and expenses associated with third parties that may otherwise be involved in conventional mortgage loan transfer and real estate purchases. The benefits are multiplied for financial institutions having large portfolios of mortgage asserts and significant transaction activity conducted on the mortgage asset auction system described. It is understood, however, that in certain embodiments blockchain structure and blockchain automation may be considered optional and need not be provided while still realizing substantial benefits of the mortgage asset auction system as described herein.

Financial institution representatives may place bid queries or bid orders at any convenient time from desktop devices, handheld devices or mobile devices providing access to the mortgage asset auction system described above. Subject to continued availability of mortgage assets offered on the mortgage asset auction system, financial institution representatives may likewise accept bid orders to complete mortgage asset transactions at any desired time or from any device of their choosing. Institutions may adjust asking prices as the system operation and behavior of bidders becomes better understood via actual system usage and experience. As the institutions become more competitive in their asking prices and in their bids, mortgage assets may be transferred more quickly and efficiently. Mortgage portfolio asset risks may be mitigated for individual institutions as foreclosed property assets or sold or as loan assets are acquired to improve and balance mortgage asset portfolios. Local, regional, domestic and international economies are insulated from adverse effects caused by institutional inability to dispose of foreclosed property assets in a more favorable way.

As will be appreciated based on the foregoing specification, the above-described embodiments of the disclosure may be implemented using computer programming or engineering techniques including computer software, firmware, hardware or any combination or subset thereof, wherein the technical effects described above are achieved. Any such resulting program, having computer-readable code, may be embodied or provided within one or more computer-readable media, thereby making a computer program product, (i.e., an article of manufacture), according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A mortgage portfolio asset auction system comprising:
at least one host computing device comprising at least one processor in communication with a memory device, the at least one host computing device communicatively coupled between a payment processing network and a plurality of financial institution computing devices, the at least one host computing device includes a first blockchain node in a blockchain network, wherein the at least one processor is configured to:
provide a portal accessible to the plurality of financial institution computing devices associated with financial institutions that are members of the payment processing network;
receive, via the portal, mortgage asset data from the plurality of financial institution computing devices, the mortgage asset data including an asking price for at least one mortgage asset that is being offered for sale;
query, by the first blockchain node for each mortgage asset included in the received mortgage asset data, the blockchain network on a mortgage asset identifier corresponding to the mortgage asset;
receive, by the first blockchain node for each mortgage asset included in the received mortgage asset data, stored mortgage asset data from a last block in a respective blockchain corresponding to the mortgage asset;
verify, for each mortgage asset included in the received mortgage asset data, the stored mortgage asset data against the received mortgage asset data;
assemble a mortgage asset inventory of each verified mortgage asset from the received mortgage asset data;
receive, via the portal, a bid order from a first one of the plurality of financial institution computing devices associated with a first financial institution, the bid order including mortgage asset purchase criteria;
filter the mortgage asset inventory in view of the mortgage asset purchase criteria to identify mortgage assets corresponding to the bid order;
generate at least one ranked list of the identified mortgage assets by applying at least one predetermined preference criteria;
present the at least one ranked list to the first one of the plurality of financial institutions;
receive, via the portal, an input from the first financial institution indicating a selection of a target mortgage asset from the at least one ranked list;
interface with the payment processing network, in response to the received selection input, to pay for a transfer of the target mortgage asset to the first financial institution, comprising sending, by the at least one processor, an authorization message to the payment processing network for authorization of a payment from an account of the first financial institution to an account of the second financial institution, wherein the authorization message is formatted according to a proprietary communications standard promulgated by the payment processing network for the exchange of financial transaction data between the financial institutions that are members of the payment processing network; and invoke, by the first blockchain node using information regarding the transfer of the target mortgage asset, a smart contract, the smart contract deployed on the blockchain network for recording mortgage asset transfers, wherein the first blockchain node broadcasts over the blockchain network the invoking of the smart contract, and wherein the broadcast causes the blockchain network to record the transfer of the target mortgage asset by adding a new block subsequent to the last block in the respective blockchain corresponding to the target mortgage asset.

2. The system of claim 1, wherein the at least one host computing device is configured to:

score the identified mortgage assets according to at least one combination of a weighting factor and a financial institution preference parameter.

3. The system of claim 2, wherein the at least one host computing device is configured to:

apply one or more financial institution preference parameters selected from the group of:
a financial institution preference parameter that defines a percentage of identified mortgage assets offered by at least one of a plurality of financial institutions;
a financial institution preference parameter that is input by the first financial institution;
a financial institution preference parameter corresponding to at least one a frequency and recency of transactions in a prior purchase history between the first financial institution and a financial institution offering one of the identified mortgage assets; and
a financial institution preference parameter that is based upon an affinity of the first financial institution for another selected one of the plurality of financial institutions.

4. The system of 1, wherein the at least one host computing device is configured to:

generate a first ranked list of the identified mortgage assets and a second ranked list of the identified mortgage assets, each of the first and second ranked lists being ranked according to different criteria; and
compare a portion of the first ranked list to a portion of the second ranked list to identify matching entries on the first portion and the second portion.

5. The system of claim 4, wherein the at least one host computing device is configured to:

generate the first ranked list according to financial institution preference criteria and generate the second ranked list according to pricing criteria for the identified assets.

6. The system of claim 1, wherein the at least one host computing device is configured to recommend a mortgage asset from the at least one ranked list for the first financial institution to purchase.

7. The system of claim 1, wherein the at least one host computing device is configured to verify at least a portion of the received mortgage asset data.

8. The system of claim 1, wherein the at least one host computing device is configured to submit an accepted order for the target mortgage asset to the payment processing network.

9. The system of claim 1, wherein the at least one host computing device is configured to apply a preferred issuer tolerance band to the asking price to mortgage assets offered by identified ones of the plurality of financial institution computing devices when filtering the mortgage asset inventory.

10. The system of claim 1, wherein the at least one host computing device is configured to accept an incentive that may be redeemed by the first financial institution in purchasing a mortgage asset.

11. The system of claim 1, wherein the at least one host computing device is configured to perform an ownership transfer task for an accepted bid order.

12. The system of claim 1, wherein the at least one host computing device is configured to receive foreclosed property asset data from each of the plurality of financial institution computing devices.

13. A method for electronically auctioning mortgage portfolio assets by participating financial institutions, the method implemented with at least one host computing device including a first blockchain node in a blockchain network and having at least one processor in communication with a memory device, the at least one host computing device communicatively coupled between a payment processing network and a plurality of financial institution computing devices, the method comprising:

providing, by the at least one host computing device, a portal accessible to the plurality of financial institution computing devices associated with financial institutions that are members of the payment processing network;
receiving, by the at least one host computing device, mortgage asset data from each of the plurality of financial institution computing devices, the mortgage asset data including an asking price for at least one mortgage asset that is being offered for sale;
querying, by the first blockchain node for each mortgage asset included in the received mortgage asset data, the blockchain network on a mortgage asset identifier corresponding to the mortgage asset;
receiving, by the first blockchain node for each mortgage asset included in the received mortgage asset data, stored mortgage asset data from a last block in a respective blockchain corresponding to the mortgage asset;
verifying, for each mortgage asset included in the received mortgage asset data, the stored mortgage asset data against the received mortgage asset data;
assembling, by the at least one host computing device, a mortgage asset inventory of each verified mortgage asset from the received mortgage asset data;
receiving, by the at least one host computing device via the portal, a bid order from a first one of the plurality of financial institution computing devices associated with a first financial institution, the bid order including mortgage asset purchase criteria;
filtering the mortgage asset inventory in view of the mortgage asset purchase criteria to identify mortgage assets corresponding to the bid order;
generating at least one ranked list of the identified mortgage assets by applying at least one predetermined preference criteria;
presenting the at least one ranked list to the first one of the plurality of financial institutions;
receiving, by the at least one host computing device via the portal, an input from the first financial institution indicating a selection of a target mortgage asset from the at least one ranked list;

interfacing with the payment processing network, in response to the received selection input, to pay for a transfer of the target mortgage asset to the first financial institution, comprising sending, by the at least one processor, an authorization message to the payment processing network for authorization of a payment from an account of the first financial institution to an account of the second financial institution, wherein the authorization message is formatted according to a proprietary communications standard promulgated by the payment processing network for the exchange of financial transaction data between the financial institutions that are members of the payment processing network; and invoking, by the first blockchain node using information regarding the transfer of the target mortgage asset, a smart contract, the smart contract deployed on the blockchain network for recording mortgage asset transfers, wherein the first blockchain node broadcasts over the blockchain network the invoking of the smart contract, and wherein the broadcast causes the blockchain network to record the transfer of the target mortgage asset by adding a new block subsequent to the last block in the respective blockchain corresponding to the target mortgage asset.

14. The method of claim 13, further comprising scoring the identified mortgage assets according to at least one combination of a weighting factor and a financial institution preference parameter.

15. The method of claim 14, further comprising:
applying one or more of a financial institution preference parameter selected from the group of:
  a financial information parameter that defines a percentage of identified mortgage assets offered by at least one of a plurality of financial institutions;
  a financial institution preference parameter that is input by the first financial institution;
  a financial institution preference parameter corresponding to a prior purchase history between the first financial institution and a financial institution offering one of the identified mortgage assets, wherein the financial institution preference parameter is based upon at least one of a frequency and recency of transactions in the prior purchase history; and
  a financial institution preference parameter that is based upon an affinity of the first financial institution for another selected one of the plurality of financial institutions.

16. The method of claim 13, further comprising:
generating a first ranked list of the identified mortgage assets and a second ranked list of the identified mortgage assets, each of the first and second ranked lists being ranked according to different criteria; and
comparing a portion of the first ranked list to a portion of the second ranked list to identify matching entries on the first portion and the second portion.

17. The method of claim 13, further comprising:
generating the first ranked list according to financial institution preference criteria and generate the second ranked list according to pricing criteria for the identified assets.

18. The method of claim 13, further comprising:
recommending a mortgage asset from the at least one ranked list for the first financial institution to purchase.

19. The method of claim 13, further comprising verifying at least a portion of the received mortgage asset data.

20. The method of claim 13, further comprising submitting an accepted order for the target mortgage asset to the payment processing network.

21. The method of claim 13, further comprising applying a preferred issuer tolerance band to the asking price to mortgage assets offered by identified ones of the plurality of financial institution computing devices when filtering the mortgage asset inventory.

22. The method of claim 13, further comprising accepting an incentive that may be redeemed by the first one of the plurality of the financial institution computing devices in purchasing a mortgage asset.

23. The method of claim 13, further comprising performing an ownership transfer task for an accepted bid order.

24. The method of claim 13, wherein receiving mortgage asset data from each of the plurality of financial institutions comprises receiving foreclosed property asset data from each of the plurality of financial institution computing devices.

25. An electronic mortgage portfolio foreclosed property asset auction system comprising:
at least one host computing device including a first blockchain node in a blockchain network and comprising at least one processor in communication with a memory device, the at least one host computing device communicatively coupled between a payment processing network and a plurality of financial institution computing devices;
wherein the at least one processor is configured to:
provide a portal accessible to the plurality of financial institution computing devices associated with financial institutions that are members of the payment processing network;
receive foreclosed property asset data from each of the plurality of financial institutions, the foreclosed property asset data including an asking price for at least one foreclosed property that is being offered for sale;
query, by the first blockchain node for each mortgage asset included in the received mortgage asset data, the blockchain network on a mortgage asset identifier corresponding to the mortgage asset;
receive, by the first blockchain node for each mortgage asset included in the received mortgage asset data, stored mortgage asset data from a last block in a respective blockchain corresponding to the mortgage asset;
verify, for each mortgage asset included in the received mortgage asset data, the stored mortgage asset data against the received mortgage asset data;
assemble a foreclosed property asset inventory from the received foreclosed property asset data of all of the plurality of financial institutions;
receive, via the portal, a bid order from a first one of the plurality of financial institutions including property asset purchase criteria;
filter the foreclosed property asset inventory in view of the property asset purchase criteria to identify foreclosed properties foreclosed properties corresponding to the bid order;
generate a ranked list of the identified foreclosed properties according to financial institution preference criteria for the respective identified foreclosed properties;
provide the ranked list of the identified foreclosed properties to the first one of the plurality of financial institutions;

receive, via the portal, an input from the first financial institution indicating a selection of a target mortgage asset from the at least one ranked list;

interface with the payment processing network, in response to the received selection input, to pay for a transfer of the target mortgage asset to the first financial institution, comprising sending, by the at least one processor, an authorization message to the payment processing network for authorization of a payment from an account of the first financial institution to an account of the second financial institution, wherein the authorization message is formatted according to a proprietary communications standard promulgated by the payment processing network for the exchange of financial transaction data between the financial institutions that are members of the payment processing network; and invoke, by the first blockchain node using information regarding the transfer of the target mortgage asset, a smart contract, the smart contract deployed on the blockchain network for recording mortgage asset transfers, wherein the first blockchain node broadcasts over the blockchain network the invoking of the smart contract, and wherein the broadcast causes the blockchain network to record the transfer of the target mortgage asset by adding a new block subsequent to the last block in the respective blockchain corresponding to the target mortgage asset.

* * * * *